(12) United States Patent
Deville et al.

(10) Patent No.: US 12,735,623 B2
(45) Date of Patent: Sep. 15, 2026

(54) CORE-SHELL PARTICLES FOR SUBTERRANEAN OPERATIONS

(71) Applicant: Halliburton Energy Services, Inc., Houston, TX (US)

(72) Inventors: Jay Deville, Houston, TX (US); Hui Zhou, Houston, TX (US); Preston Andrew May, Houston, TX (US); William W. Shumway, Houston, TX (US); Emily Hart, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/744,283

(22) Filed: Jun. 14, 2024

(65) Prior Publication Data

US 2025/0382516 A1 Dec. 18, 2025

(51) Int. Cl.
*C09K 8/487* (2006.01)
*E21B 21/00* (2006.01)

(52) U.S. Cl.
CPC ............ *C09K 8/487* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 11,124,686 B2 | 9/2021 | Rojas et al. | |
| 12,043,788 B2 | 7/2024 | Deville et al. | |
| 2007/0015668 A1 | 1/2007 | Harrower et al. | |
| 2009/0264321 A1* | 10/2009 | Showalter | C09K 8/516 507/219 |

(Continued)

FOREIGN PATENT DOCUMENTS

| | | |
|---|---|---|
| CA | 2987773 C | 5/2024 |
| CN | 104694092 B | 6/2015 |

(Continued)

OTHER PUBLICATIONS

"HPHT Wells"; Schlumberger Oilfield Review; 2016. (Year: 2016).*

(Continued)

*Primary Examiner* — Andrew Sue-Ako
(74) *Attorney, Agent, or Firm* — Conley Rose, P.C.; Rodney B. Carroll

(57) ABSTRACT

A method of servicing a wellbore penetrating a subterranean formation, the method comprising: preparing a wellbore servicing composition comprising: (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker; and (b) a carrier fluid; and placing the wellbore servicing composition into the wellbore, the subterranean formation or both.

20 Claims, 1 Drawing Sheet

(56) References Cited

U.S. PATENT DOCUMENTS

| | | | | |
|---|---|---|---|---|
| 2010/0263866 | A1 | 10/2010 | Huang et al. | |
| 2010/0300928 | A1* | 12/2010 | Oates | C09K 8/588 507/224 |
| 2011/0015301 | A1* | 1/2011 | Herth | C09K 8/5083 526/318.2 |
| 2011/0237468 | A1* | 9/2011 | Reichenbach-Klinke | C09K 8/512 507/224 |
| 2012/0015852 | A1 | 1/2012 | Quintero et al. | |
| 2012/0305254 | A1 | 12/2012 | Chen et al. | |
| 2013/0017610 | A1 | 1/2013 | Roberts et al. | |
| 2014/0349894 | A1 | 11/2014 | Quintero et al. | |
| 2014/0374095 | A1 | 12/2014 | Ladva et al. | |
| 2016/0024367 | A1* | 1/2016 | Zha | C09K 8/52 166/308.2 |
| 2016/0160113 | A1 | 6/2016 | Nguyen et al. | |
| 2016/0186032 | A1 | 6/2016 | Yu et al. | |
| 2016/0362594 | A1* | 12/2016 | Rojas | C09K 8/487 |
| 2016/0376488 | A1 | 12/2016 | Galindo et al. | |
| 2017/0088762 | A1 | 3/2017 | Zhang et al. | |
| 2018/0237680 | A1* | 8/2018 | Hall | C09K 8/72 |
| 2020/0115609 | A1 | 4/2020 | Pop et al. | |
| 2020/0270504 | A1 | 8/2020 | Khamatnurova et al. | |
| 2021/0062064 | A1* | 3/2021 | Deville | C09K 8/512 |
| 2023/0203361 | A1 | 6/2023 | Deville et al. | |
| 2024/0010902 | A1 | 1/2024 | Deville et al. | |

FOREIGN PATENT DOCUMENTS

| | | | |
|---|---|---|---|
| WO | 2006013595 | A1 | 2/2006 |
| WO | 2013116920 | A1 | 8/2013 |
| WO | 2016196332 | A1 | 12/2016 |
| WO | 2020102258 | A1 | 5/2020 |
| WO | 2024015658 | A1 | 1/2024 |

OTHER PUBLICATIONS

Foreign Communication from Related Application—United Kingdom Combined Search and Examination Report, regarding Application No. GB 2214315.0, dated Mar. 1, 2023, 7 pages.

Foreign Communication from Related Application—International Search Report and Written Opinion of the International Searching Authority, International Application No. PCT/US2022/045535, dated Jan. 30, 2023, 11 pages.

OSPAR List of Substances Used and Discharged Offshore which Are Considered to Pose Little or No Risk to the Environment (PLONOR)—Update 2021.

Foreign Communication from Related Application—International Search Report and Written Opinion of the International Searching Authority, International Application No. PCT/US2023/067781, dated Jun. 1, 2023, 12 pages.

Foreign Communication from Related Application Saudi examination report for Saudi Patent Application No. 122440898, dated Aug. 18, 2025, 9 pages.

Foreign Communication from Related Application—International Search Report and Written Opinion of the International Searching Authority, International Application No. PCT/US2025/021738, dated Jul. 10, 2025, 10 pages.

* cited by examiner

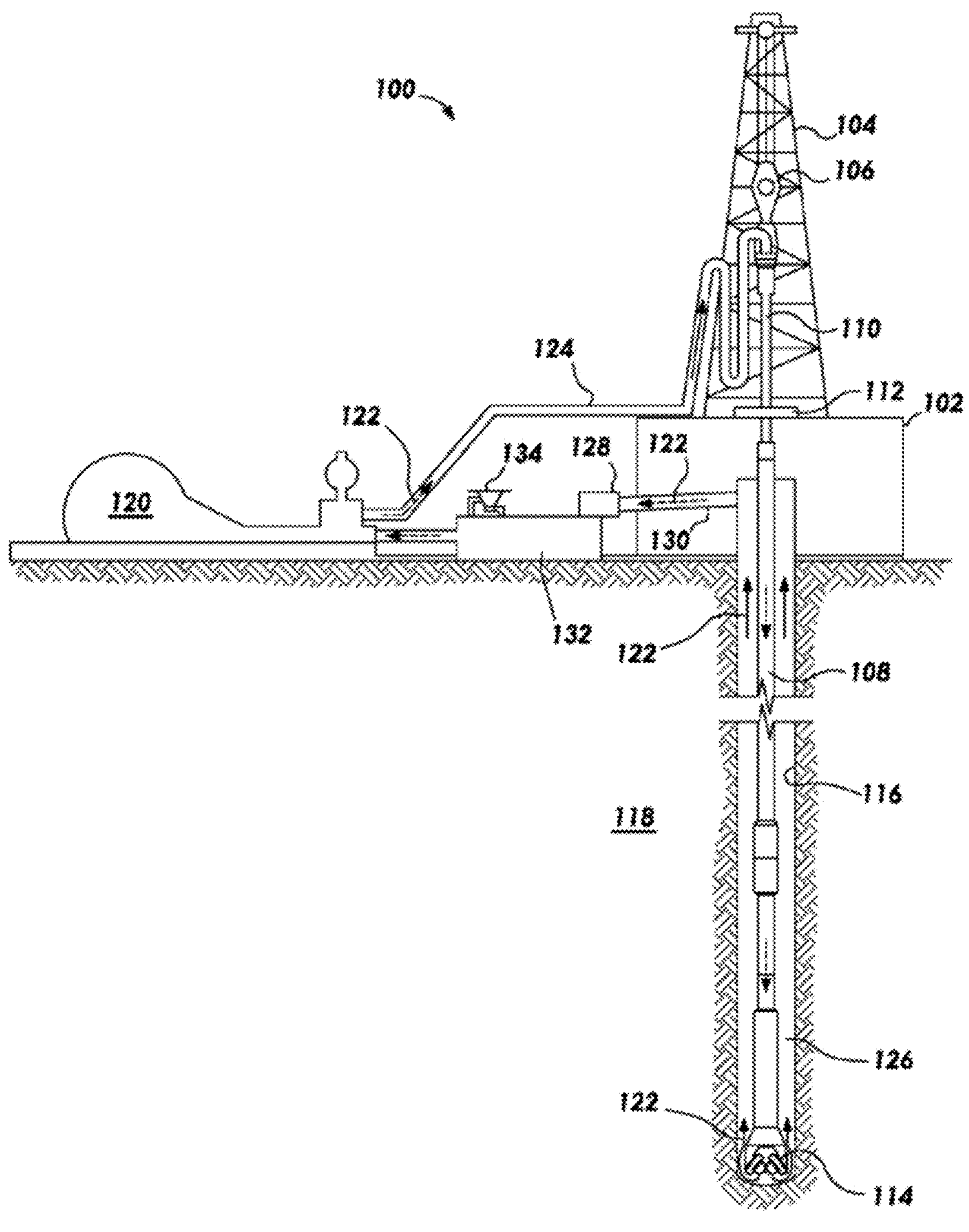
100
104
106
110
124
112
102
122
134
128
122
120
130
132
122
108
116
118
126
122
114

CORE-SHELL PARTICLES FOR SUBTERRANEAN OPERATIONS

CROSS-REFERENCE TO RELATED APPLICATIONS

None.

BACKGROUND

The present disclosure relates to systems and methods for drilling and/or treating subterranean formations. More particularly, the present disclosure relates to thermally stable core-shell particles for improved fluid loss control.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a wellbore in a subterranean formation or to complete a wellbore in a subterranean formation, as well as numerous other purposes. A drilling fluid, or "mud" which a drilling fluid is also often called, is a treatment fluid that is circulated in a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

Drilling and treatment fluids may deposit a layer of particles known as "filter cake" on the walls of the wellbores within the producing formations. The filter cake may help prevent the drilling and servicing fluids from being lost into the formation and prevents solids from entering the porosities of the rock. Following completion and prior to initiating production, the filter cake may be degraded or allowed to degrade to allow product to flow into the wellbore for production. Degrading the filter cake may retain wellbore connectivity and the natural permeability of the reservoir rock. If not degraded or allowed to degrade, the filter cake could present an impediment to production, inter alia, by altering the permeability of the reservoir. Once the permeability of the reservoir has been diminished, it is seldom able to restore it to its original condition. Drilling and treatment fluids may include fluid loss control additives to further assist in preventing the drilling and servicing fluids from being lost into the formations.

During drilling of subterranean wellbores, various strata, such as those that include reactive shales, may be encountered. As used herein, the term "shale" is defined to mean materials that may "swell," or increase in volume, when exposed to water. Examples of these shales include certain types of clays (for example, bentonite). When drilling into shale formations with water-based fluids, the formation may experience a pore pressure increase and swelling from penetration (e.g., of the shale) by the fluid. (Shale) stabilizers may be added to the mud to inhibit these phenomena and to stabilize the formation from being affected by the mud.

Reducing drilling fluid pressure invasion into the wall of a borehole may be an important factor in maintaining wellbore stability. Maintaining sufficient borehole pressure may stabilize the formation (e.g., shales) to maintain the integrity of the borehole. When mud or liquid invades the formation, the pressure in the pores may rise and the pressure differential between the mud column and the formation may fall. With the drop in differential pressure, the formation may no longer be supported and can break off and fall into the wellbore. Likewise, the invasion of water into the formation matrix may increase hydration or wetting of the subterranean formation causing it to soften and to lose its structural strength. Chemical reactivity may also lead to instability.

BRIEF DESCRIPTION OF THE DRAWINGS

These drawings illustrate certain aspects of some of the embodiments of the present disclosure and should not be used to limit or define the claims.

FIG. 1 is a diagram illustrating an example of a wellbore drilling assembly that may be used in accordance with embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Additionally, where "about" is used to describe a range, "from about x to y" or "from x to about y" both mean the same as "from about x to about y" unless specifically stated otherwise; such ranges further include the range consisting of "from x to y".

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, solubility, temperature, viscosity, and the like; intended values include rate, thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Core-shell particles comprising a particle (e.g., a nano- or microparticle) and a (e.g., polymer) shell, as per this disclosure, can provide advantages in wellbore servicing fluids (e.g., drilling fluids). Such advantages can include fluid loss control, pore pressure transmission reduction, wellbore stabilization, and/or cuttings stabilization. This disclosure provides thermally stable core-shell particles, thus offering pathways to improve the thermal stability of wellbore servicing compositions comprising the core-shell particles and a base or carrier fluid, thus allowing use of these materials in a greater number of wells, for example in wells with a bottom hole circulating temperature (BHT) of greater than or equal to about 300, 325, or 350° F. (148.9, 162.8, or 176.7° C.).

The herein disclosed core-shell particles (also referred to herein as "core-shell composites", "composites", "stabilizing additive", and "hybrid particles") include a nano- or microparticle core with a (e.g., synthetic) polymer shell. As detailed hereinbelow, the polymer shell can be formed using more thermally-stable monomers and/or more thermally-stable crosslinkers than conventional standard monomers and/or crosslinkers.

Core-shell nano- or microparticles with a shell polymerized with thermally stable monomers and/or crosslinkers can have enhanced thermal stability relative to similar core-shell particles using non-thermally stable monomers and/or crosslinkers. The thermal stability of the herein disclosed nano- or micro-core-shell particles can be improved by the use of one or more monomers for the polymer shell that are resistant to hydrolytic degradation. For example, monomers (referred to herein as "thermally stable monomers") such as, without limitation, N-vinylpyrrolidone (NVP), vinylbenzenesulfonate, dimethyldiallyl ammonium halide, 1-vinylimidazole, or 4-vinylpyridine can be used alone or in combination with conventional, non-thermally stable monomers ("referred to herein as "non-thermally stable monomers"), such as, without limitation, acrylic acid, acrylamide, or substituted acrylamide monomers, such as, without limitation, methacrylamide, 2-acrylamido-2-methyl propane sulfonic acid (AMPS), N,N-dimethylacrylamide, 2-(dimethylamino)ethyl methacrylate, and 2-(dimethylamino)ethyl acrylate. For example, NVP, 1-vinylimidazole, and 4-vinylpyridine are thermally stable monomers that are less prone to hydrolysis in the presence of water, and vinylbenzenesulfonate is a thermally stable monomer that does not hydrolyze in water. Thus, the incorporation of such thermally stable monomers in the polymer shell according to this disclosure can impart improved thermal stability to the herein disclosed hybrid nano- or micro-core-shell particle composites. Thermally stable can indicate that greater than or equal to 90% of covalent bonds in the component (e.g., monomer or crosslinker) remain intact after exposure to temperatures up to 350° F. in an aqueous environment for 16 hours.

Alternatively or additionally, the thermal stability of wellbore servicing compositions comprising the herein disclosed core-shell particles can be improved by crosslinker choice. In embodiments, non-hydrolyzable or hydrolysis-resistant cross-linkers (wherein "hydrolysis resistant" indicates that a majority of the core-shell particles retain cross-linking at elevated BHTs; referred to herein as "thermally stable cross-linkers") can be utilized to form the polymer shells of the core-shell particles, thus imparting improved thermal stability to the hybrid core-shell nano- or micro-particles relative to conventional particles formed using conventional non-thermally stable crosslinkers. Examples of suitable cross-linkers (e.g., "thermally stable" crosslinkers") include, without limitation, divinyl ether, diallyl ether, vinyl or allyl ethers of polyglycols or polyols (such as pentaerythritol allyl ether (PAE), allyl sucrose, ethylene glycol divinyl ether, triethylene glycol divinyl ether, diethylene glycol divinyl ether, glycerol diallyl ether, polyethylene glycol divinyl ether, propylene glycol divinyl ether, and trimethylolpropane diallyl ether), N,N'-divinylethyleneurea (DVEU), divinylbenzene, and divinyltetrahydropyrimidin-2(1H)-one, dienes (such as 1,7-octadiene and 1,9-decadiene), triallyl amine and tetraallylammonium derivatives (such as triallylamine, triallyl alkylammonium halide, tetraallylammonium halide, and tetraallylethylene diamine), N-vinyl-3(E)-ethylidene pyrrolidone, ethylidene bis(N-vinylpyrrolidone), or a combination thereof. The thermally stable cross-linkers can be used alone or in combination with more standard ("non-thermally stable") cross-linking agents, such as, without limitation, N,N'-methylenebisacrylamide.

Embodiments of this disclosure can employ the use of standard, less thermally stable monomers (referred to herein as "conventional", "standard", or "non-thermally stable monomers") with more thermally stable cross-linkers (referred to herein as "stable cross-linkers"), the use of more thermally stable monomers (referred to herein as "thermally stable monomers") with standard cross-linkers (referred to herein as "conventional", "standard", or "non-thermally stable cross-linkers"), or the use of both more thermally-stable monomers and more thermally stable crosslinkers to provide a more thermally stable core-shell particle for wellbore servicing compositions.

Generally, the nano- or microparticle can comprise particles in the size range of 1-1500 nanometers (nm). The core-shell particle core can comprise inorganic particles, such as, without limitation, nanosilica, surface-modified nanosilica, nano iron oxide, nano alumina, nanoclays, nano calcium carbonate, nano barite, nano illmenite, nano manganese tetraoxide nano titania, and/or (e.g., precipitated) barium sulfate, among others. The core-shell particle core can alternatively or additionally comprise an organic core made, such as a core made from cellulosics such as, without limitation, nut shells, or carbon black, bitumen, fly ash, pulverized coal, or, other non-water soluble organic nano- or micro-sized particles, or combinations of the aforementioned. The organic core may provide an advantage of being lower density, which could allow for higher concentrations of the product to be used, in embodiments.

As detailed further hereinbelow, the polymer of the shell can be associated with the nano- or microparticles through covalent and/or non-covalent interactions. Covalent interactions include, for example, silane chemistry, where the polymer can be directly bonded to the core/particle surface. Non-covalent interactions include electrostatic interactions, wherein the polymer/shell can be associated with the core by electrostatic attraction. In such cases, the polymer may or may not be cross-linked.

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The wellbore defines a wellbore wall that is the exposed portion of the subterranean formation where the wellbore was formed. The drilling fluid may be circulated downwardly through the drilling pipe and back up the annulus between the wellbore wall and the outside of the drilling pipe.

After a wellbore is formed, it may be desirable to perform a cementing operation. A treatment fluid called a spacer fluid can be introduced into the wellbore after the drilling fluid and before the cement composition. The spacer fluid can flush residual drilling fluid that may remain in parts of the wellbore or face of the subterranean formation to help ensure better bonding of the cement composition to the interface. Other types of oil or gas operations, for example, completion or workover operations can also be performed with a treatment fluid.

The wellbore wall and near-wellbore region of the subterranean formation can include permeable areas. Examples of permeable areas include cracks, natural fissures, fractures, vugs, interconnected pores, or induced fractures. Cracks, fissures, and fractures can generally be characterized as having a length greater than its diameter. Vugs and holes can be characterized as being any cavity having a variety of shapes and sizes. Porosity refers to the number of individual pores within an area of the subterranean formation. Permeability and all grammatical variations thereof, in this context, refers to the amount of interconnectivity between the individual pores that allows fluid to migrate or move between the interconnected pores. Permeable areas in the wall of the wellbore and near-wellbore region can vary and have dimensions ranging from 0.1 micrometers and as large as 50 micrometers or larger. As used herein, a "permeable area" means any area where fluid can flow into the subterranean formation via a wellbore and can be caused by, without limitation, cracks, fissures, fractures, cavities, and interconnected pores.

Some of the base fluid or filtrate of a treatment fluid can undesirably flow into the subterranean formation via the permeable areas instead of remaining in the wellbore and being circulated back up to the wellhead. This is known as fluid loss. In order to overcome the problems associated with fluid loss, a fluid loss control additive can be used. As the treatment fluid is placed into the well, the fluid loss control additive can eliminate or lessen the amount of liquid base fluid or filtrate entering the subterranean formation.

Fluid loss control additives can form a filter cake on the wall of the wellbore to reduce or stop fluid loss. A filter cake is the residue deposited on a permeable medium when a slurry, such as a drilling fluid, is forced against the medium under pressure. The filtrate is the liquid that passes through the medium, leaving the cake on the medium. In filter cake deposition, the slurry, that commonly includes materials including water, a gelling agent, calcium carbonate, weighting agents, and/or polymers, is introduced into the open-hole wellbore. The fluid flows into a desired portion of the well. The ingredients in the fluid form the filter cake. The filter cake can be used to bind fines, such as sand, together, and prevent fluid loss into the subterranean formation. The filter cake can help prevent fluid loss into the subterranean formation and can also help stabilize the wellbore by reinforcing the walls of the wellbore.

Some subterranean formations can be adversely affected by certain types of drilling fluids. One example of such a formation is a water-sensitive formation. When a drilling fluid contains water, and the water comes in contact with a water-sensitive formation, the water can adversely affect the subterranean formation. Some of the adverse effects can include swelling or sloughing of the subterranean formation, or gumbo formation.

An example of a water-sensitive formation is a shale formation. Shale formations are different from other types of formations, and there are even differences between individual shale formations. Typically, no two shale formations are the same. Therefore, finding ways to explore and develop shale gas from these formations is a challenge. Shale stabilizers can be added to the drilling fluid to inhibit these phenomena and to stabilize the shale from being affected by the drilling fluid. Reducing drilling fluid pressure invasion into the wall of a wellbore can be an important factor in maintaining wellbore stability. Maintaining sufficient wellbore pressure can stabilize shales to maintain the integrity of the wellbore. For example, when liquid from the drilling fluid invades the shale, the pressure in the pores may rise and the pressure differential between the drilling fluid column and the shale may fall. With the drop in differential pressure, the shale may no longer be supported and can break off and fall into the wellbore. Moreover, the invasion of water into the shale matrix can increase hydration or wetting of the partially dehydrated shale body causing it to soften and to lose its structural strength. Chemical reactivity of drilling fluid additives and the shale formation can also lead to instability.

Stabilizing additives can be added to drilling fluids. The stabilizing additive can help stabilize the wall of the wellbore via filter cake formation or in water-sensitive formations. However, environmental regulations can limit which ingredients can be used in oil or gas operations. Desirably, stabilizing additives are environmentally acceptable.

Herein disclosed is a treatment fluid that can include a base fluid and a stabilizing additive comprising thermally stable core-shell particles. Also provided are methods of treating a subterranean formation can include introducing the treatment fluid into the subterranean formation.

It is to be understood that the discussion of any of the embodiments regarding the treatment fluid or any ingredient in the drilling fluid is intended to apply to all of the method and composition embodiments without the need to repeat the various embodiments throughout. Any reference to the unit "gallons" means U.S. gallons.

The treatment fluid can be used in a variety of oil or gas operations. The treatment fluid can be, for example, a drilling fluid, a completion fluid, a spacer fluid, a workover fluid, a stimulation fluid, a packer fluid, an insulating fluid, a well-bore cleaning fluid, or a cement composition.

The treatment fluid can be a colloid, a heterogenous fluid, an emulsion, or an invert emulsion. The treatment fluid includes a base fluid. The base fluid can include dissolved materials or undissolved solids. The base fluid can include a hydrocarbon liquid, or an internal phase of the treatment fluid can include a hydrocarbon liquid. The hydrocarbon liquid can be selected from a fractional distillate of crude oil; a fatty derivative of an acid, an ester, an ether, an alcohol, an amine, an amide, an alkylated carbonate, or an imide; a saturated hydrocarbon; an unsaturated hydrocarbon; a branched hydrocarbon; a cyclic hydrocarbon; or a combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The treatment fluid can include water. The water can be selected from freshwater, seawater, brine, and a combination thereof in any proportion. The treatment fluid further includes a water-soluble salt. The water-soluble salt can be a monovalent salt or divalent salt. The water-soluble salt can be selected from sodium chloride, sodium bromide, sodium acetate, sodium formate, sodium iodide, calcium chloride, calcium bromide, calcium iodide, potassium chloride, potassium bromide, potassium acetate, potassium formate, potassium iodide, magnesium chloride, zinc bromide, cesium formate, or a combination thereof. The treatment fluid can have a desired water phase salinity. Water phase salinity is a factor showing the activity level of salt in a drilling fluid and can indicate the concentration of dissolved salt in the fluid. The treatment fluid can have a water phase salinity in the range of 100 to 310,000 parts per million (ppm) or greater. According to any of the embodiments, the treatment fluid is a water-based drilling fluid.

The treatment fluid includes a stabilizing additive of core-shell particles of this disclosure, detailed further hereinbelow. The treatment fluid can be used in offshore operations.

The stabilizing additive can be added to the base fluid of the treatment fluid in neat form as a dry powder. The stabilizing additive can be added to the base fluid of the treatment fluid as a suspension. The suspension fluid can include water or a hydrocarbon liquid. By way of example, the suspension fluid can be an ester, such as an ester of fatty acids, with non-limiting examples including vegetable oils, animal (fish) oils, or seed oils. Examples of vegetable or seed oils include, but are not limited to, palm, soybean, tall, sunflower, olive, and others.

The stabilizing additive can be a nano- and/or microcomposite and can be in the form of nano- and/or microparticles. As used herein, the term "nanocomposite" means a material made up of more than one material and has an average particle size at a largest dimension in the range of 1 to 200 nanometers (nm). As used herein, the term "microcomposite" means a material made up of more than one material and has an average particle size at a largest dimension in the range of 200 to 1,500 nanometers (nm). As used herein, the term "nanoparticle" means a solid material having various geometric shapes with an average particle size at a largest dimension in the range of 1 to 200 nm. As used herein, the term "microparticle" means a solid material having various geometric shapes with an average particle size at a largest dimension in the range of 200 to 1,500 nm.

The stabilizing additive comprises, consists essentially of, or consists of thermally stable core-shell particles (also referred to herein as a composite), as described further herein. The core-shell particles comprise a core and a shell. The shell can wholly or partially surround the core. The core of each of the core-shell particles can comprise a particle selected from an inorganic particle or an organic particle. The core can comprise an inorganic core such as silica (e.g., crystalline silica, amorphous silica, or a combination thereof), iron oxide, barite, alumina, clays, calcium carbonate, titanium oxide (e.g., titania or titanium dioxide), surface-modified versions thereof, or a combination thereof. The core can comprise an organic particle such as a cellulosic particle (e.g., nut shells or other non-water soluble organic particles). The material of the core (and/or the core-shell) can be environmentally acceptable or biocompatible. The material can be selected from a list of materials on the PLONOR list of substances that can be used in the North Sea, for example.

The core of the herein-disclosed core-shell particles can include any known nano- and/or microparticles compatible with subterranean formations including, but not limited to, quantum dots including quantum dots of cadmium selenide, cadmium sulfide, indium arsenide, indium phosphide, copper indium sulfide, zinc sulfide, and the like; carbon particles including carbon cage structures like fullerenes and carbon nanotubes (single and multi-walled), graphenes (single and multilayered), and nanodiamonds; polymeric particles including particles of gums, chitosans, gelatins, sodium alginates, albumins, cellulosics, poly(ethylene imines), poly (ethylene glycols), poly(propylene glycols), poly(acrylic acids), poly(vinyl alcohols), methacrylates, acrylates, poly (2-hydroxy ethyl methacrylates), poly(methyl methacrylates), poly(methyacrylic acids), poly(vinyl pyrrolidones), acrylamides, poly(acrylamides), poly(ethylene-co-vinyl acetates), polylactides, polyglycolides, polyanhydrides, polyorthoesters, polycyanoacrylates, polycaprolactone, and copolymers thereof; dendrimers including 2nd or higher generation dendrimers and 2nd or higher generation dendrons; ceramic particles including clays and particles of composite ceramics, carbides, borides, nitrides, siilcides, and oxides like silicas, aluminas, beryllias, cerias, and zirconias; core-shell particles including multi-shell particles, also known as onionated particles; metal particles including particles of gold, silver, iron, copper, nickel, zinc, tin, or a combination thereof; metal oxide particles including oxides of chromium, manganese, iron, cobalt, nickel, copper, zinc, molybdenum, indium, tin, lead, gadolinium, erbium, any oxidation state thereof, or a combination thereof; nanowires including nanowires of metals, semimetals, metal oxides, ceramics, or a combination thereof; diamond nanosensors; functionalized derivatives thereof including water-dispersible derivatives and oil-dispersible derivatives; or a combination thereof.

In embodiments, the core material includes, consists essentially of, or consists of silica, modified silica, titania, iron oxide, or another organic or inorganic nanoparticle. In embodiments, the core of the composite has a size of from about 5 nm to about 500 nm. In embodiments, the core of the composite has a size of from about 5 nm to about 450 nm, or about 5 nm to about 400 nm, or about 5 nm to about 350 nm, or about 5 nm to about 300 nm, or about 5 nm to about 250 nm, or about 5 nm to about 200 nm, or about 5 nm to about 150 nm, or about 5 nm to about 100 nm, or about 5 nm to about 50 nm, or about 5 nm to about 20 nm, or about 10 nm to about 500 nm, or about 10 nm to about 400 nm, or about 10 nm to about 300 nm, or about 10 nm to about 200 nm, or about 10 nm to about 100 nm, or about 10 nm to about 50 nm, or about 10 nm to about 40 nm, or about 10 nm to about 30 nm, or about 10 nm to about 20 nm. In embodiments, average particle size indicates average size of discrete particles, not agglomerates thereof. In other embodiments, the particle size indicates average size of particle agglomerates. In embodiments, the particle size is an average dimension in at least one direction.

In embodiments, the core-shell particles of this disclosure can be synthesized using two or more core particle sources. For example, in embodiments, core particles having an average particle size of about 10 nm to 20 nm are mixed with core particles having an average particle size of 100 nm to 200 nm in a single synthesis of composites. By using two or more core particle sources, bimodal or higher order modes of composite particle average sizes may be obtained. In embodiments, the two or more core particle sources include particles of varying composition. Such core particle sources may be blended to obtain a final product having two different composite compositions. In embodiments, core particle sources of different average particle size, different composition, or both are blended in a single synthesis to reach a targeted composite composition.

In embodiments, the core-shell composites can include colloidal particulates suspended in water and dry particulates. Suitable inorganic core particles can include silica, treated or partially treated fumed silica, colloidal silica, or silica-alumina composite particles; alumina, titania, zirconia, or clay; carbon; and natural product based particulates such as lignite. In embodiments, nanoporous, microporous and/or mesoporous particulates incorporating these chemistries can be useful in forming the composites. In embodiments, any of these particulates may be used with or without surface treatment thereof. In embodiments, surface treatments may be employed to produce a more hydrophobic particulate surface; such particulates are termed hydrophobically modified. For example, silane coupling agents (general formula of $(RO)_3SiR'$, where R and R' are alkyl groups) are commonly employed to condense and/or bond to the surface of the core particulate, thereby providing an alkyl group (R') on the particle surface to increase the hydrophobicity of the surface. In embodiments, R' is a polymerizable group, such as an acrylate or acrylamide functional group. In such embodiments, subsequent polymerization leads to a polymer grafted to the core particle.

The shell of the core-shell particles comprises a polymer that is a polymerization product of one or more monomers and optionally one or more cross-linkers. According to this disclosure, the one or more monomers include a thermally stable monomer, the one or more cross-linkers include a thermally stable cross-linker, or the one or more monomers include the thermally stable monomer and the one or more cross-linkers include the thermally stable cross-linker. Thermally stable indicates that inclusion of the component (e.g., the thermally stable monomer and/or the thermally stable cross-linker) in the core-shell particles of a wellbore servicing composition provides for stability of the core-shell particles (e.g., maintenance of association of the core with the shell of the core-shell particles, maintenance of cross-linking between the core and the shell) at temperatures of greater than or equal to at least about 300, 325, or 350° F. (148.9, 162.8, or 176.7° C.). Although the core-shell particles are understood to provide enhanced thermal stability at such higher BHTs, it is to be understood that the core-shell particles can be utilized in wellbore operations in which such elevated BHTs are not encountered (i.e., the wellbore servicing compositions of this disclosure comprising the more thermally stable core-shell particles can be utilized at BHTs below 300, 325, or 350° F. (148.9, 162.8, or 176.7° C.), for example at BHTs of 100, 200, or 250° F., in embodiments.

In embodiments, the shell of the composite includes, consists essentially of, or consists of an organic water soluble polymer, or a crosslinked polymer that would be water soluble if not crosslinked. In embodiments, the cross-linked polymer including acrylamide repeating units is a polyacrylamide copolymer. In embodiments, the core-shell composites may not substantially swell in water and, thus, may not cause significant viscosification or gelation of the treatment fluid. In embodiments, the core-shell particles may be thermally stable up to at least about 300° F. In embodiments, the composites may be thermally stable up to at least about 325° F. In embodiments, the composites may be thermally stable up to at least about 350° F.

As discussed further hereinbelow, the herein disclosed core-shell particles (e.g., the core thereof or the core-shell itself) can comprise primarily micro-particles (e.g., have an average particle size or a median particle size (d50) of greater than or equal to about 1, 1.25, or 1.5 micrometer) or primarily nanoparticles (e.g., have an average particle size (e.g., d50) of less than or equal to about 50, 150, or 200 nanometer), or can comprise a combination of nanoparticles and microparticles. In embodiments, the core-shell particles (e.g., the cores thereof) can have an average particle size or a d50 in a range of from about 1 to about 1500, from about 1 to about 1000, or from about 1000 to about 1500 nm.

In embodiments, the enhanced thermal stability of the core-shell particles is provided by the use of one or more cross-linkers that include a thermally stable cross-linker. The thermally stable cross-linker is non-hydrolyzable or hydrolysis resistant, wherein hydrolysis resistant indicates that a majority of the core-shell particles retain cross-linking at elevated BHTs. Examples or thermally stable cross-linkers include, without limitation, divinyl ether, diallyl ether, vinyl or allyl ethers of polyglycols or polyols (such as pentaerythritol allyl ether (PAE), allyl sucrose, ethylene glycol divinyl ether, triethylene glycol divinyl ether, diethylene glycol divinyl ether, glycerol diallyl ether, polyethylene glycol divinyl ether, propylene glycol divinyl ether, and trimethylolpropane diallyl ether), N,N'-divinylethyleneurea (DVEU), divinylbenzene, and divinyltetrahydropyrimidin-2(1H)-one, dienes (such as 1,7-octadiene and 1,9-decadiene), triallyl amine and tetraallylammonium derivatives (such as triallylamine, triallyl alkylammonium halide, tetraallylammonium halide, and tetraallylethylene diamine), N-vinyl-3(E)-ethylidene pyrrolidone, ethylidene bis(N-vinylpyrrolidone), or a combination thereof. In addition to the thermally stable cross-linker, the cross-linker can further include a (non-thermally stable, conventional, standard) cross-linker. Such a conventional cross-linker can include, without limitation, acrylate or methacrylate diesters of diols such as glycols, acrylate or methacrylate diesters, triesters, or higher functionality esters of polyols including sugar alcohols (e.g. ethylene glycol, diethylene glycol, triethylene glycol, polyethylene glycol, propylene glycol, polypropylene glycol, glycerol, pentaerythritol, 1,1,1-trimethylolpropane, erythritol, sorbitol, and the like) and sugars, and bisacrylamide compounds such as N,N'-methylene bisacrylamide, vinyl or allyl esters (such as diallyl carbonate, divinyl adipate, divinyl sebacate, diallyl phthalate, diallyl maleate, diallyl succinate), 1,3,5-triallyl-1,3-5-triazine-2,4,6(1H,3H,5H)-trione, and triallyl cyanurate, or a combination thereof.

In embodiments, the core-shell particles of this disclosure comprise a polymer shell formed with one or more monomers including the thermally stable monomer. The thermally stable monomer can be resistant to hydrolytic degradation, wherein resistant to hydrolytic degradation can be indicated by a maintenance of the shell integrity of the core-shell particles and/or viscosity (e.g., no decreasing viscosity) of the wellbore servicing composition at elevated BHTs. Resistance to hydrolysis can be determined by NMR, viscosity (Huggins), gel permeation chromatography (GPC), size exclusion chromatography (SEC), Fourier-Transform Infrared Spectroscopy (FTIR), or a combination thereof. The thermally stable monomer can comprise, for example, N-vinylpyrrolidone (NVP), vinylbenzenesulfonate, diallyldimethyl ammonium halide, 1-vinylimidazole, 4-vinylpyridine, or a combination thereof. In embodiments, the thermally stable monomer can comprise N-vinylpyrrolidone (NVP), vinylbenzenesulfonate, 1-vinylimidazole, 4-vinylpyridine, or a combination thereof. The polymer shell can further include a monomer that is not thermally stable (e.g., a standard or conventional non-thermally stable monomer, such as provided herein). The more thermally stable monomer can be utilized with a standard or thermally stable cross-linker, according to this disclosure.

The polymeric shell can wholly or partially surround the core particles. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups or side chains connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. As used herein, a “polymer” can include a cross-linked polymer. As used herein, a “cross link” or “cross linking” is a connection between two or more polymer molecules. A cross-link between two or more polymer molecules can be formed by a direct interaction between the polymer molecules, or conventionally, by using a cross-linking agent that reacts with the polymer molecules to link the polymer molecules. As noted above, the polymer shell may or may not be covalently attached to the core. The (e.g., organic or inorganic) core can be wholly or partially surrounded by the polymeric shell via a variety of processes, an example of which is described hereinbelow.

A polymer has an average molecular weight, which is directly related to the average chain length of the polymer. For a copolymer, each of the monomers will be repeated a certain number of times (number of repeating units). The average molecular weight for a copolymer can be expressed as follows: average molecular weight=$(MW_1*RU_1)+(MW_2*RU_2)$ . . . , wherein $MW_1$ is the molecular weight of the first monomer; $RU_1$ is the number of repeating units of the first monomer; $MW_2$ is the molecular weight of the second monomer; and $RU_2$ is the number of repeating units of the second monomer. A terpolymer would include three monomers, a tetra polymer would include four monomers, and so on. The polymer for the shell can have a molecular weight greater than 10,000, in embodiments.

The composite can include a shell that includes, consists essentially of, or consists of an organic water soluble polymer, or a crosslinked polymer that would be water soluble if not crosslinked. The organic water soluble polymer or crosslinked polymer can be formed from one or more monomers. In embodiments, the monomers can include one or more thermally stable monomers noted hereinabove, and/or one or more conventional, non-thermally stable monomers, such as acrylamide, methacrylamide, N,N-dimethylacrylamide, N-isopropylacrylamide, acrylic acid and salts thereof, 2-acryloylamino-2-methylpropane-1-sulfonic acid (AMPSA) and salts thereof, dimethylaminopropyl methacrylamide (DMAPMA), methacrylamido propyltrimethylammonium chloride (MAPTAC), [3-(acryloylamino) propyl]trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC), or a combination thereof, in any ratio.

As noted hereinabove, in embodiments, the shell comprises a crosslinked polymer that can be crosslinked with a crosslinking agent. As used herein, the term "crosslinking agent" includes any molecule, atom, or ion that is capable of forming one or more crosslinks between molecules of the crosslinkable polymer and/or between two or more atoms in a single molecule of the crosslinkable polymer. As used herein, the term "crosslink" as used herein refers to a covalent or ionic bond that links one polymer chain to another. When crosslinked, any crosslinking agent known in the art can be used. In embodiments, suitable crosslinking agents can include at least one of polyfunctional acrylamides, methacrylamides, polyfunctional ethers, and/or compounds containing more than one vinyl or allyl group. In embodiments, the crosslinking agent comprises a dialdehyde, a dialdehyde-forming compound, a carboxylic acid or an ester thereof, a sulfonic acid or an ester thereof, a phosphonic acid or an ester thereof, an acid anhydride, an epihalohydrin, a di-epoxide, or a combination thereof. Examples of such crosslinking agents that can be suitable in embodiments of this disclosure include, but are not limited to, epichlorohydrin, glutaraldehyde, succinaldehyde, paraformaldehyde, other dialdehydes, or a combination thereof. In embodiments, crosslinking agents can include one or more ions of chromium, aluminum, antimony, zirconium, titanium, calcium, boron, iron, silicon, copper, zinc, magnesium, or a combination thereof. Examples of such crosslinking agents that can be suitable in embodiments include, but are not limited to one or more thermally stable crosslinkers noted hereinabove and/or non-thermally stable crosslinkers, such as boric acid, borax, a borate, a ($C_1$-$C_{30}$) hydrocarbylboronic acid, a ($C_1$-$C_{30}$) hydrocarbyl ester of a ($C_1$-$C_{30}$) hydrocarbylboronic acid, a ($C_1$-$C_{30}$) hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, aluminum citrate, or a combination thereof.

When used, the crosslinking agent can be included in the fluid in any suitable amount depending on, among other factors, the amount and/or molecular weight of the crosslinked polymer, the desired viscosity of the fluid, and the like. In embodiments, the crosslinking agent can be included in amount that is about 0.1, 0.2, 0.3, 0.4, 0.5, 0.6, 0.7, 0.8, 0.9, 1, 1.25, 1.5, 1.75, 2, 2.25, 2.5, 2.75, 3, 4, 5, 6, 7, 8, 9, or 10 weight percent of the amount of monomer included in the fluid. In embodiments, the crosslinking agent can be included in amount that is about 1.5 percent of the amount of monomers included in the fluid. In embodiments, the shell comprises a concentration of greater than or equal to about 0.5, 0.6, 0.7, 0.8, 0.9, 1, 1.25, 1.5, 1.75, 2, 2.25, 2.5, 2.75, 3, 4, or 5 weight percent (wt %) (e.g., from about 1, 2, 3, 4, 5, 6, 7, 8, 9, or 10 to about 5, 6, 7, 8, 9, 10, or more wt %) of total (e.g., thermally and/or non-thermally stable crosslinkers) crosslinker (e.g., with the remainder of the shell being provided by the one or more thermally stable and/or non-thermally stable monomers).

The polymeric shell can impart desirable properties to the stabilizing additive containing the core-shell particles. Non-limiting examples of such desirable properties include increasing the thermal stability of the core particles, preventing aggregation of the core particles in the treatment fluid, stabilizing against contaminants in the treatment fluid or reservoir fluid by protecting the surface charge of the core particles, and/or altering the wettability of the additive. The polymeric shell can also have tackifying properties, in embodiments. A tacky shell can cause the core-shell particles to better adhere to the wall of the wellbore and other constituents within the filter cake due to the stickiness thereof.

The core particles can be coated with the polymer shell prior to use. According to another embodiment, the core particles and the polymer can be introduced into the subterranean formation in the treatment fluid, and the polymer can coat (wholly or partially) the core particles in situ within the wellbore during introduction of the treatment fluid into the subterranean formation. According to some such embodiments, the polymer can be solubilized or dispersed in the treatment fluid. The polymer can then interact downhole with the core particles to coat and form the polymeric shell. As noted above, in embodiments, the interaction between the polymer and the core particles can be a non-chemical interaction, for example an electrostatic attraction.

In embodiments, the one or more cross-linkers utilized with a thermally stable monomer(s) can include the thermally stable cross-linker, such as described hereinabove. For example, the thermally stable cross-linker can be non-hydrolyzable or hydrolysis resistant. The thermally stable cross-linker can be selected from, for example, pentaerythritol allyl ether (PAE), N,N'-divinylethyleneurea (DVEU), divinylbenzene, diallyldimethyl ammonium halide, tetraallylammonium chloride, or a combination thereof. Again, the cross-linker can comprise or further include a (e.g., non-thermally stable) cross-linker as described hereinabove, such as selected from acrylate or methacrylate diesters of diols such as glycols, acrylate or methacrylate diesters, triesters, or higher functionality esters of polyols including sugar alcohols (e.g. glycerol, erythritol, sorbitol, pentaerythritol, trimethanolpropane, and the like) and sugars, and bisacrylamide or bismetharylamide compounds such as N,N'-methylene bisacrylamide, or a combination thereof. The wellbore servicing composition comprising the thermally stable monomer(s) can further include a conventional non-thermally stable monomer(s) that is (are) not thermally stable, as described herein.

As briefly mentioned hereinabove, the polymer shell of the core-shell particles of this disclosure can be associated with the core via covalent and/or non-covalent interactions. In embodiments, the polymer can be associated with the core via covalent interactions. Such covalent interactions can include additional chemistry (e.g., silane chemistry), whereby the polymer can be directly bonded to the surface of the particle core via chemical (e.g., silane) bonding. Alternatively or additionally, the polymer of the shell can be associated with the core via noncovalent interactions. Such non-covalent interactions include, for example, electrostatic interactions whereby the polymer is associated with the particle via electrostatic attraction. Accordingly, in embodiments, the polymer is not cross-linked, in which instances, the shell can comprise a polymer that may not be cross-linked.

The core-shell particles/composite of this disclosure can be formed by any known or to be discovered methods. For example, nanocomposite synthesis is described in Bhardwaj et al., J. Mat. Sci. (2010) 45:1008-1016. The polymer shell can be applied to the particulate core via in situ polymerization using a water-in-oil emulsion ("w/o latex"). During the synthesis, the particulates can be suspended within a discontinuous water phase of the latex along with water soluble monomers; upon initiation of polymerization, the monomers can be polymerized in the presence of the core particles to form a discrete core-shell morphology having a narrow size distribution attributed to the narrow size range of the discontinuous water phase. The latex product that results does not precipitate, but in some embodiments the latex can be precipitated and dried, and the solids can be divided, for example into a powder. Commonly employed drying mechanisms, such as spray drying of the lattices, can be utilized to provide non-agglomerated core-shell composite particles that, upon resuspension in water, can form discrete, divided particulates having substantially the same size range as measured at the end of the synthesis and prior to drying the core-shell composite. In embodiments, the latex product can be concentrated by evaporation of at least a portion of the oil phase, water phase, or both after polymerization is completed.

The synthesis of the core-shell composites can utilize combinations of one or more core particulates and w/o latex polymerization components: a water phase including one or more water soluble monomers (which can be or include one or more thermally stable monomers), an oil phase including a non-aqueous solvent or oil, and at least one surfactant suitable to stabilize the water phase as a discontinuous phase within a continuous oil phase. Optionally, as described herein, a water soluble crosslinker (that can be or include a thermally stable crosslinker, as described herein) can be included in the water phase. The core particulate can be added to the water phase or to the w/o latex prior to polymerization. After one or more the core particulates and w/o latex polymerization components are combined, polymerization can be initiated according to conventional inverse emulsion polymerization processes to provide the core-shell composites of this disclosure, residing substantially within the water phase of the w/o latex.

In embodiments, the one or more monomers are present in the water phase at about 5 wt % to 50 wt % based on the total weight of the w/o latex, or about 5 wt % to 40 wt %, or about 5 wt % to 30 wt %, or about 5 wt % to 20 wt %, or about 10 wt % to 50 wt %, or about 15 wt % to 50 wt %, or about 20 wt % to 50 wt %, or about 25 wt % to 50 wt %, or about 30 wt % to 50 wt %, or about 35 wt % to 50 wt %, or about 40 wt % to 50 wt %, or about 20 wt % to 40 wt % based on the total weight of the w/o latex.

The one or more monomers can be as detailed hereinabove, and can include one or more thermally stable monomers, one or more non-thermally stable monomers, or a combination thereof. Nonlimiting examples of non-thermally stable monomers employed in the synthesis of the shell portion of the core-shell composites can include acrylamide, methacrylamide, N,N-dimethylacrylamide, N-isopropylacrylamide, acrylic acid and salts thereof, 2-acryloylamino-2-methylpropane-1-sulfonic acid (AMPS A), dimethylaminopropyl methacrylamide (DMAPMA), methacrylamido propyltrimethylammonium chloride (MAPTAC), [3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC) or a combination thereof in any ratio. In embodiments, the monomers comprise, consist essentially of or consist of one or more thermally stable monomers as described herein, acrylamide and/or acrylic acid, or a combination thereof. In embodiments, the monomers comprise, consist essentially of or consist of one or more thermally stable monomers as described herein, acrylamide, acrylic acid, AMPSA, or a combination thereof. In embodiments, the monomers comprise, consist essentially of or consist of one or more thermally stable monomers as described herein, acrylamide, AMPSA, or a combination thereof. In embodiments, the monomers comprise, consist essentially of or consist of one or more thermally stable monomers as described herein, acrylamide, or a combination thereof.

As noted hereinabove, a (e.g., water soluble) crosslinker can be included in the w/o latex. Useful crosslinkers can include water or oil soluble compounds, such as water soluble compounds having two or more unsaturated moieties that are reactive with free radical sources. For example, in embodiments, the cross-linkers include one or more thermally stable cross-linkers as described hereinabove, and/or one or more non-thermally stable crosslinkers, such as acrylate diesters of diols such as glycols, acrylate diesters, triesters, or higher functionality esters of polyols including sugar alcohols (e.g. glycerol, erythritol, sorbitol, and the like) and sugars, and bisacrylamide compounds such as N,N'-methylene bisacrylamide, or a combination thereof. Where present, the one or more cross-linkers can be employed in the w/o latex at about 1 wt % or less of the w/o latex, for example about 0.01 wt % to 1 wt %, or about 0.05 wt % to 1 wt %, or about 0.1 wt % to 1 wt %, or about 0.01 wt % to 0.5 wt %, or about 0.01 wt % to 0.4 wt %, or about 0.01 wt % to 0.3 wt %, or about 0.01 wt % to 0.2 wt %, or about 0.01 wt % to 0.1 wt %, or about 0.05 wt % to 0.5 wt %, or about 0.1 wt % to 0.3 wt % of the latex.

Also present in the w/o latex can be an amount of water sufficient to form a water phase within the latex. Water can be present in the w/o latex at about 30 wt % to 60 wt % based on the total weight of the w/o latex, or about 35 wt % to 60 wt %, or about 40 wt % to 60 wt %, or about 45 wt % to 60 wt %, or about 30 wt % to 55 wt %, or about 30 wt % to 50 wt %, or about 35 wt % to 50 wt %, or about 40 wt % to 50 wt % based on the total weight of the w/o latex. In embodiments, the water is a water source.

Also present in the w/o latex can be an amount of oil sufficient to form a continuous oil phase within the latex. In embodiments, the oil is not flammable at temperatures less than about 90° C., or less than about 80° C., or less than about 70° C. In embodiments, the oil is a mixture of compounds, wherein the mixture is less than 0.1 wt % soluble in water at 25° C. and can be substantially a liquid over the range of 20° C. to 90° C. In embodiments, the oil comprises, consists essentially of, or consists of one or more linear, branched, or cyclic hydrocarbon moieties, aryl or alkaryl moieties, or combinations of two or more such moieties. In some embodiments, the oil has a density of about 0.8 g/L to 1.0 g/L, for example about 0.8 g/L to 0.9 g/L. Examples of suitable oils include decane, dodecane, isotridecane, cyclohexane, toluene, xylene, naphtha, and mixed paraffin solvents. In embodiments, the oil can be present in the w/o latex at about 20 wt % to 50 wt % based on the total weight of the w/o latex, or about 25 wt % to 50 wt %, or about 30 wt % to 50 wt %, or about 20 wt % to 45 wt %, or about 20 wt % to 40 wt %, or about 25 wt % to 45 wt %, or about 25 wt % to 40 wt %, or about 30 wt % to 40 wt % based on the total weight of the w/o latex.

Also present in the w/o latex can be one or more latex surfactants. Latex surfactants can be utilized to form and stabilize the w/o lattices during polymerization and to maintain stability until inversion. Conventionally employed surfactants for w/o lattices include nonionic ethoxylated fatty acid esters, block copolymers of ethylene oxide and propylene oxide, ethoxylated sorbitan fatty acid esters, sorbitan esters of fatty acids such as sorbitan monolaurate, sorbitan monostearate, and sorbitan monooleate, block copolymers of ethylene oxide and hydroxy acids having a $C_{10}$-$C_{30}$ linear or branched hydrocarbon chain, and blends of two or more of these, that can be targeted to achieve a selected hydrophilic/lipophilic balance (HLB). A plethora of surfactants can be utilized throughout the industry to form and stabilize w/o lattices, serving as a medium for polymerization of monomers and further maintaining emulsion stability of the polymerized product formed therein until further processing or subsequent use in the field. Any nonionic surfactants and blends thereof conventionally employed in w/o lattices can be suitably utilized in conjunction with the present invention. In embodiments, the latex surfactant can be a single nonionic surfactant or blend thereof having a combined HLB value of about 4 to 11, for example about 5 to 11, or about 6 to 11, or about 5 to 9, or about 5 to 10, or about 6 to 10, or about 7 to 10. Suitable surfactants can include sorbitan monooleate and Polysorbate 85 (sold by some sources under the trade names SPAN® 80 and TWEEN® 85, respectively), ethoxylated sorbitan fatty acid esters sold under various trade names.

In embodiments, the latex surfactants can be present in the w/o latex at about 5 wt % to 15 wt % of the w/o latex, or about 6 wt % to 15 wt %, or about 7 wt % to 15 wt %, or about 8 wt % to 15 wt %, or about 9 wt % to 15 wt %, or about 10 wt % to 15 wt %, or about 5 wt % to 14 wt %, or about 5 wt % to 13 wt %, or about 5 wt % to 12 wt %, or about 5 wt % to 11 wt %, or about 5 wt % to 10 wt %, or about 5 wt % to 9 wt %, or about 5 wt % to 8 wt %, or about 5 wt % to 7 wt % of the w/o latex.

Representative amounts of the above noted components can be suitably included in one or more w/o lattices, with the amounts selected to provide optimal kinetic stability of the latex.

The w/o lattices can optionally include one or more additives. Salts, buffers, acids, bases, chain transfer agents, thermal stabilizers, metal chelators, coalescing solvents, and the like are optionally included in the w/o lattices. In embodiments, the additives, included with or separately from the w/o latex, can include one or more corrosion inhibitors, scale inhibitors, emulsifiers, water clarifiers, hydrogen sulfide scavengers, gas hydrate inhibitors, biocides, pH modifiers, antioxidants, asphaltene inhibitors, and/or paraffin inhibitors. In embodiments, the additives can include one or more inverting surfactants, which can be ionic or nonionic surfactants with an HLB of greater than about 10. While the amount of an additive usefully employed in the w/o latex depends on the additive and the intended application, in general the amount of any individual additive can be from about 0 wt % to about 5 wt % based on the total weight of the w/o latex, or about 0 wt % to 4 wt %, or about 0 wt % to 3 wt %, or about 0 wt % to 2 wt %, or about 0. wt % to 1 wt % based on the total weight of the latex.

The core particulate can be added to the water phase prior to formation of the w/o latex, or can be added to the w/o latex after the other components are assembled. The core particulates are as described hereinabove, and can be added to the w/o latex at about 0.1 wt % to 10 wt % of the w/o latex, or about 0.2 wt % to 10 wt %, or about 0.3 wt % to 10 wt %, or about 0.4 wt % to 10 wt %, or about 0.5 wt % to 10 wt %, or about 1 wt % to 10 wt %, or about 2 wt % to 10 wt %, or about 3 wt % to 10 wt %, or about 4 wt % to 10 wt %, or about 0.1 wt % to 9 wt %, or about 0.1 wt % to 8 wt %, or about 0.1 wt % to 7 wt %, or about 0.1 wt % to 6 wt %, or about 0.1 wt % to 5 wt %, or about 0.1 wt % to 4 wt %, or about 0.1 wt % to 3 wt %, or about 0.1 wt % to 2 wt %, or about 0.1 wt % to 1 wt %, or about 0.5 wt % to 7 wt %, or about 0.5 wt % to 6 wt %, or about 0.5 wt % to 5 wt %, or about 1 wt % to 5 wt % of the w/o latex.

In embodiments, the w/o lattices are made using conventional equipment and methodology. Accordingly, in embodiments a w/o latex containing the one or more monomers and core particulate can be formed and the polymerization initiated within the water phase of the latex. The method of initiation, and the equipment and compounds employed to initiate polymerization are not particularly limited. A wide range of water soluble free-radical or redox type initiators can work to initiate the polymerization; water insoluble initiators such as azobisisobutyronitrile (AIBN) are also commonly employed to initiate polymerization in the water phase. Conventional methods of initiation including exclusion of air, heating, and stirring for a period of time to accomplish the polymerization can be utilized to polymerize the one or more monomers present in the w/o latex and result in a core-shell composite latex composition.

After polymerization, the weight ratio of core particle to polymer in the core-shell composite particles can be about 1:100 to 50:50, for example about 2:98 to 50:50, or about 3:97 to 50:50, or about 4:97 to 50:50, or about 5:95 to 50:50, or about 1:100 to 40:60, or about 1:100 to 30:70, or about 1:100 to 20:80, or about 1:100 to 10:90, or about 1:100 to 5:95.

The core particles can act as a substrate for polymer growth during the core-shell particles synthesis. The size of the water phase droplets within the continuous oil phase can control the size of the polymer shell as it forms around the core particles. For purposes of providing a controlled, reproducible product, it can be advantageous to provide uniform size distribution of a core-shell composite derived from a single core particle source. In addition to efficient manufacturing, a more uniform core-shell composite can enable predictability and optimization of particle packing when the core-shell composite is incorporated a wellbore servicing fluid (e.g., a drilling fluid), and thus dosing amounts of the core particulate may be predicted in the field. Performance of the core-shell composites can thus be repeatable and predictable in one or more mud drilling applications. Additionally, the ability to provide controlled bimodal or higher order mode size distributions, as described herein, can be facilitated by providing two or more core-shell composite average particle size distributions in a single synthesis.

In embodiments, the average particle size of the core-shell composites is about the same as, or is less than, the particle size that arises when the corresponding polymer is synthesized under the same conditions but without the nanoparticulate. Thus, for example, in embodiments an acrylamide homopolymer synthesized in a w/o latex in the absence of nanoparticulate has about the same average particle size after completion of polymerization as the same acrylamide polymer when synthesized under the same conditions but with no nanoparticle present. In embodiments, an acrylamide homopolymer synthesized in a w/o latex in the absence of core particulate (i.e., a polymer particle) has a larger average particle size after completion of polymerization than the same acrylamide polymer when synthesized under the same conditions but with a core particle present (i.e., a core-shell composite particle of this disclosure), for example about 5% to 50% larger average particle size, or about 10% to 30% larger average particle size.

In embodiments, it is possible to synthesize the core-shell composites using dispersion polymerization techniques. A dispersion polymerization in water can be utilized where it is desirable to avoid the use of oil, and/or wherein it is desirable to reduce or eliminate the use of surfactants. The polymerization can be carried out substantially in water, wherein the product of the polymerization can be a core-shell composite dispersed in water, substantially free of oil and having a reduced surfactant level or being substantially free of surfactant.

As described further hereinbelow, the wellbore servicing fluid of this disclosure comprising the core-shell particles can be utilized to provide fluid loss control; well stability; cutting stability; pressure transmission reduction, or a combination thereof.

The core-shell particles of this disclosure can be hydrolysis resistant, such that (or as indicated by) the polymer does not break down, as reflected in a stable (i.e., changing/reducing by less than about 1, 2, 3, 4, or 5%) viscosity (e.g., over time). In embodiments, the wellbore servicing composition of this disclosure has a total filtrate loss of less than 50, 30, or 15 milliliters using a particle plugging test with a disk having 12 micrometer pores at testing conditions of a pressure differential of 1,200 psi (8.3 megapascals) and a temperature of 180° F. (82.2° C.). In embodiments, the wellbore servicing composition of this disclosure has an API spurt loss of less than 5, 3, or 1 milliliters using a particle plugging test with a disk having 12 micrometer pores at testing conditions of a pressure differential of 1,200 psi (8.3 megapascals) and a temperature of 180° F. (82.2° C.).

In embodiments, the thermally stable core-shell particles of the present disclosure can reduce fluid loss against pore sizes that range from about 100 times to about 1000 times the average size of the core-shell particles.

The cores and resulting core-shell particles produced therefrom can have a variety of sizes and shapes. According to any of the embodiments, the cores/core-shell particles can have a desired particle size distribution. Particle-size distribution ("PSD") indicates the percentage of particles of a certain size (or in a certain size interval) in the whole. The PSD can also be a list of values or a mathematical function that defines the relative amount, typically by mass, of particles present according to size. As used herein, PSD can be determined by dynamic light scattering or laser diffraction.

The PSD can be quantified into size classes or fractions, such as d10, d50, and d90 by plotting the PSD on a graph. D10 means 10% of the particles have a particle size that is less than this value. D50 means 50% of the particles have a particles size less than and 50% greater than this value. The d50 value is also known as the median particle size. D90 means 90% of the particles have a particles size less than this value.

A wellbore servicing fluid of this disclosure can comprise the thermally stable core-shell particles and a carrier fluid (also referred to herein as a "base" fluid). The wellbore servicing fluid can be a drilling fluid. For example, the wellbore servicing composition of this disclosure can be an aqueous based drilling fluid. Alternatively, the wellbore servicing composition of this disclosure can be a non-aqueous based drilling fluid. As detailed further hereinbelow, the wellbore servicing composition of this disclosure can further comprise conventional wellbore servicing or drilling fluid additives, such as described hereinbelow.

In embodiments, the wellbore servicing composition of this disclosure comprises from about 1 to about 15, from about 3 to about 12, or from about 5 to about 10.5 pounds per barrel (lb/bbl) of the core-shell particles. As detailed further hereinbelow, placing the wellbore servicing composition in the wellbore, the subterranean formation, or both can provide filtration control and/or reduction of fluid loss.

The PSD of the core particles and/or core-shell particles comprising same can be selected such that a test treatment fluid containing the stabilizing additive has a total filtrate loss using a permeability plugging apparatus with a disk having 12 micrometer pores at testing conditions of a pressure differential of 1,200 psi (8.3 megapascals) and a temperature of 180° F. (82.2° C.) less than 50 milliliters (mL) and an API spurt loss of less than 5, 3, or 1 mL. The particles can have a particle size distribution of a d50 value in the range of 50 to 200 nm. The core particles can also have a particle size distribution of a d50 value in the range of 5 to 50 nm.

As used herein, "permeability plugging testing" of a test treatment fluid is tested using a permeability plugging apparatus developed and marketed by FANN™ instruments. The Permeability Plugging Apparatus (PPA) is a high pressure, high temperature instrument designed to simulate downhole static filtration. The PPA operates at temperatures and pressures that represent well conditions, and the filtration medium is positioned above the sample fluid. The filter media is a ceramic disc. These discs closely simulate the structure of the formation, providing a more authentic representation of the filter cake that is actually being developed on the wall of the formation. Ceramic discs are available in several pore sizes.

Permeability plugging testing can be performed at a specified temperature and pressure differential using API 13B-1 or 13B-2 testing procedures as follows. The jacket of the PPA is pre-heated to the specified testing temperature. The base fluid of the test fluid is mixed with any ingredients, such as, for example, a weighting agent and the core-shell particles, in a low shear mixer at a high enough revolutions per minute (rpm) such that a vortex of approximately 0.5 inches (in.) is created for 5 minutes (min.). The PPA test cell is then pressurized to the specified testing pressure. The test fluid is then poured into a standard permeability plugging apparatus (PPA) test cell. An appropriately sized disk and the back pressure assembly is placed on the test cell. A timer set for 30 minutes is started. The filtrate valve is opened by turning it counterclockwise ½ turn to start the filtration. The cell pressure, indicated on the pump gauge, will drop initially. The pump can be manually operated to maintain the desired test pressure. One minute after the valve is opened and the desired pressure is applied, the drain valve is opened on the backpressure receiver and the filtrate is collected. The liquid is continued to be collected until the reservoir blows dry. The drain valve is then shut. Filtrate volume should be collected at additional time increments, including at 7.5 minutes, until the conclusion of the test at 30 minutes. Additional pressure is applied to the cell in order to maintain a constant test pressure and on the back pressure receiver for the duration of the test. The volume collected after 7.5 minutes is recorded as the 7.5-minute volume (V7.5). After 30 minutes have elapsed, the filtrate valve is closed, and all the filtrate from the backpressure receiver is drained into the graduated cylinder. The volume collected after 30 minutes is recorded as the "total filtrate" (V30). The API spurt loss can be calculated as two times the 7.5-minute volume times 2 minus the total filtrate as shown in equation 1 below.

$$API\ spurt\ \text{loss} = 2 * [(2 * V7.5) - V30] \quad \text{Eq. 1}$$

Spurt loss thus provides a measure of the instantaneous volume (spurt) of liquid that passes through a filter medium prior to deposition of a competent and controlling filter cake. Less spurt loss represents less fluid loss prior to formation of a sufficient filter cake. Pore pressure transmission measures the increase in pore pressure in a formation (e.g., shale) when exposed to a drilling fluid over a period of time. Pore pressure transmission approximates the amount of fluid lost to pores of a (e.g., shale) formation. The composite of this disclosure can be used in a wellbore fluid formulation to reduce fluid loss in a formation during wellbore treatment operations.

The PSD can also be selected to impart desirable properties to the core-shell particles. By way of a first example, a desirable property is filter cake formation. Accordingly, the PSD can be selected such that filter cake formation occurs during and after introduction of the treatment fluid into a subterranean formation. Filter cake formation can also reduce fluid loss into the subterranean formation, such as by providing a total filtrate of less than 50 mL and an API spurt loss of less than 5 mL in a permeability plugging apparatus. By way of another example, a desirable property is stabilization of water-sensitive formations. Accordingly, the PSD can be selected such that the wall of a wellbore of a water-sensitive formation is stabilized and/or formation (e.g., shale) sloughing, pressure migration through filtrate invasion, or other adverse effects are substantially reduced or preferably prevented. Filter cake formation can also aid in stabilizing the formation by reducing water penetration of water in a water-based treatment fluid into the formation and reacting with reactive components of the formation. True filter cake formation may not occur in water-sensitive subterranean formations. Therefore, the treatment fluid of this disclosure can reduce pressure transmission into these water-sensitive formations by sealing exposed surfaces of the formations.

The treatment fluid can have a total filtrate loss of less than 50 milliliters, less than 30 mL, or less than 15 mL using a particle plugging test with a disk having 12 micrometer pores at testing conditions of a pressure differential of 1,200 psi (8.3 megapascals) and a temperature of 180° F. (82.2° C.). The treatment fluid can also have an API spurt loss of less than 5, 3, or 1 mL at the same testing conditions.

The stabilizing additive/core-shell particles can be in a sufficient concentration such that the treatment fluid has a total filtrate loss of less than 50, 30, or 15 mL, an API spurt loss of less than 5, 3, or 1 mL, or both at the same testing conditions. In embodiments, the core-shell particles can be in a concentration in the range of 1 to 35 pounds per barrel of the treatment fluid (lb/bbl) (3.9 to 135.3 kilograms per cubic meter ($kg/m^3$)).

A test treatment fluid can be used to determine the predicted performance of whether the treatment fluid provides the desired stabilization to the wellbore. It is to be understood that while the treatment fluid can contain other ingredients, the stabilizing additive (e.g., the core-shell particles and the base fluid) can be primarily or wholly responsible for providing the requisite wellbore stabilization. For example, a "test treatment fluid" consisting essentially of, or consisting of, the base fluid and the core-shell particles and in the same proportions as the treatment fluid can have the desirable properties to provide stabilization. It is also to be understood that any discussion related to a "test treatment fluid" is included for purposes of demonstrating that while the treatment fluid being introduced into a wellbore may contain other ingredients, it is the stabilizing additive that provides the desired wellbore stabilization. Therefore, while it may not be possible to perform a test in a wellbore for the specific treatment fluid being introduced, one can formulate a test treatment fluid to be tested in a laboratory to identify if the ingredients and concentration of the ingredients will provide the desired wellbore stabilization. The test treatment fluid can also include the other ingredients and in the same concentrations as in the treatment fluid.

A test treatment fluid consisting of the base fluid and the core-shell particles having a particle size distribution of a d50 value in the range of 50 to 200 nm, can have a total filtrate loss of less than 50, 30, or 15 milliliters using a particle plugging test with a disk having 12 micrometer pores at testing conditions of a pressure differential of 1,200 psi (8.3 megapascals) and a temperature of 180° F. (82.2° C.). The test treatment fluid can also have an API spurt loss of less than 5, 3, or 1 mL at the same testing conditions.

The treatment fluid of this disclosure can also contain other ingredients (or "additives"). The other ingredients can comprise insoluble particles, for example: ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; ground nut shells, for example walnut, almond, or pecan; ground seed shells, for example sunflower seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; any composite particle thereof; and a combination thereof. The other ingredients can also be ingredients that chemically react to form a cementitious substance, for example, diatomaceous earth, and lime; a viscosifier; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant;

a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and a combination thereof. The other ingredients can also include conventional filtration control additives such as starch, modified cross-linked starches, carboxymethyl cellulose (CMC), polyanionic cellulose (PAC), etc. It has been discovered that conventional filtration control additives do not provide the same amount of wellbore stabilization as the stabilizing additive.

As noted herein, the treatment fluid can comprise one or more additional additives, such as bridging agents, shale inhibitors, salts, and/or viscosifiers. In embodiments, the drilling and treatment fluids of the present disclosure may include the core-shell particles, one or more shale inhibitors, and one or more salts.

The treatment fluids used in the methods and systems of the present disclosure can include any base fluid known in the art, including aqueous base fluids, non-aqueous base fluids, and a combination thereof. The term "base fluid" or "carrier fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or a combination thereof. In embodiments of the present disclosure, the aqueous fluids include one or more ionic species, such as those formed by salts dissolved in water. For example, seawater and/or produced water may include a variety of divalent cationic species dissolved therein. In embodiments, the density of the aqueous fluid can be adjusted, among other purposes, to provide additional particulate transport and suspension in the compositions of the present disclosure. In embodiments, the pH of the aqueous fluid may be adjusted (e.g., by a buffer or other pH adjusting agent) to a specific level, which may depend on, among other factors, the types of viscosifying agents, acids, and other additives included in the fluid. In embodiments, the treatment fluids may include a mixture of one or more aqueous fluids with other fluids and/or gases, including but not limited to emulsions, foams, and the like.

In embodiments, the treatment fluids used in the methods and systems of the present disclosure may include an emulsion. The emulsions of the present disclosure can generally include two or more immiscible liquids, such as a polar (aqueous) fluid and a nonpolar (oil-based) fluid. In embodiments, the emulsions of the present disclosure may be traditional emulsions (e.g., emulsions having an aqueous continuous phase and an oil-based discontinuous phase). In other embodiments, the emulsions of the present disclosure may be invert emulsions (e.g., emulsions having an oil-based continuous phase and an aqueous discontinuous phase). The aqueous phase of the emulsions can include water from any source. Suitable aqueous fluids can include any of the aqueous base fluids discussed above. The oil-based phase can include any type of oil-based liquid. Examples of oil-based liquids that may be suitable for use in the methods and systems of the present disclosure include, but are not limited to, oils, hydrocarbons, esters, ethers, non-polar organic liquids, and the like. In embodiments, the oil-based liquid can be diesel oil. The two phases of the emulsion can be included in any suitable amounts and/or ratios. For example, in embodiments, the emulsion can include an aqueous phase and an oil phase in a ratio of from about 99:1 to about 1:99. In embodiments, the emulsion of the present disclosure can be a water-in-oil emulsified acid. In embodiments, the core-shell particles of the present disclosure can be contained in the water-based continuous phase.

In embodiments, the treatment fluids used in the methods and systems of the present disclosure can include an emulsifier. The emulsifier can be an emulsifying surfactant or any other emulsifier suitable to lower the interfacial tension between oil and water to allow stable emulsion formation. Depending upon the particular application of the methods of the present disclosure, the surfactant can be cationic, anionic, nonionic, or amphoteric, and can be monomeric or polymeric. Types of cationic surfactants that can be suitable for embodiments of the present disclosure include, but are not limited to, arginine methyl esters, alkanolamines, alkylenediamines, alkyl amines, alkyl amine salts, quaternary ammonium salts such as trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, $C_8$ to $C_{22}$ alkylethoxylate sulfate, trimethylcocoammonium chloride, derivatives thereof, or combinations thereof. Types of anionic surfactants that can be suitable for embodiments of the present disclosure include, but are not limited to, alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, phosphate esters alkyl carboxylates, alkylether carboxylates, N-acylaminoacids, N-acylglutamates, N-acylpolypeptides, alkylbenzenesulfonates, paraffinic sulfonates, α-olefin sulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, or combinations thereof. Types of non-ionic surfactants that can be suitable for embodiments of the present disclosure include, but are not limited to, amides, diamides, polyglycol esters, alkyl polyglycosides, sorbitan esters, methyl glucoside esters and alcohol ethoxylates alcohol oxylalkylates, alkyl phenol oxylalkylates, nonionic esters such as sorbitan esters alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylates. Examples of non-ionic surfactants that can be suitable include, but are not limited to, alkylphenol ethoxylates, nonylphenol ethoxylates, octylphenol ethoxylates, tridecyl alcohol ethoxylates, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, and the like.

In embodiments, the drilling and treatment fluids of the present disclosure can include one or more bridging agents. Examples of bridging agents suitable for use in the methods of the current disclosure include, but are not necessarily limited to, calcium succinate, calcium maleate, magnesium tartrate, bismuth citrate, calcium carbonate, and other salts, clays, biopolymer viscosifiers, modified and unmodified starches, polyanionic cellulose, graphite, lignite, gilsonite, petroleum coke, any derivatives thereof, and any hydrates thereof. Examples of degradable bridging agents may include, but are not necessarily limited to, bridging agents including degradable materials such as degradable polymers. In embodiments, the bridging agents can be either self-degrading or degradable in a suitable clean-up solution (e.g., a mutual solvent, water, an acid solution, etc.). In embodiments, a polymer is considered to be "degradable" herein if the degradation is due to, inter alia, chemical and/or radical process such as hydrolysis, oxidation, enzymatic degradation, or UV radiation. Suitable examples of degradable polymers that can be used in accordance with the present disclosure include, but are not necessarily limited to, polysaccharides such as dextrans or celluloses; chitins; chitosans; proteins; orthoesters; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); polyphosphazenes; any derivatives thereof; and a combination thereof. In embodiments, the bridging agents can be in the water-based continuous phase of an oil in water emulsified treatment fluid. In embodiments, the treatment fluids including core-shell composites of the present disclosure and a bridging agent can provide greater fluid loss control than a treatment fluid with only the core-shell composites or bridging agent alone.

In embodiments, the drilling and treatment fluids of the present disclosure including thermally stable core-shell particles can further include one or more shale inhibitors. In embodiments, the shale inhibitors can be amines, such as primary, secondary, tertiary, and quaternary amines; ethoxylated and propoxylated amines, Jeffamines, hexamethylenediamine and derivatives, choline chloride, guanidine, glycols, polyalkylene glycols, potassium salts, silicates, polymers of acrylamide, acrylic acid and salt derivatives, and vinylpyrrolidone such as polyacrylamide, partially hydrolyzed polyacrylamide, polyvinypyrrolidone, and copolymers of these polymers. In embodiments, the shale inhibitor comprises: an amine; an ethoxylated amine; a propoxylated amine; a Jeffamine; hexamethylenediamine; choline chloride; guanidine; a glycol; a polyalkylene glycol; a potassium salt; a silicate; a polymer of acrylamide; acrylic acid; a salt of acrylic acid; vinylpyrrolidone; a partially hydrolyzed polyacrylamide, polyvinylpyrrolidone, and copolymers of these polymers; any derivative thereof; or a combination thereof. In embodiments, the shale inhibitors can comprise one or more amines included in an amount of about 0.5% to about 4% by volume (1.75 lb/bbl to about 14 lb/bbl). In embodiments, the shale inhibitors can comprise one or more glycols included in an amount of about 0.5% to about 4% by volume (1.75 lb/bbl to about 14 lb/bbl). In embodiments, the shale inhibitors can comprise one or more polymers included in an amount of about 0.1 lb/bbl to about 2 lb/bbl).

In embodiments, the treatment fluids of the present disclosure can contain one or more salts, inter alia, to provide the desired density to the treatment fluid. Caution can be used when combining a salt with a treatment fluid for use in certain regions of the world where such use of a salt may be subject to environmental restrictions. In applications, it can be desirable to use a dense brine rather than, among other things, a solid weighting agent. Where the use of a salt is permissible, a variety of salts may be used. Examples of suitable salts include, but are not limited to, potassium chloride, sodium chloride, potassium formate, potassium carbonate, calcium chloride, calcium bromide, or a combination thereof. In embodiments, a mixture of suitable salts can be used. In embodiments, the salts can be present in the treatment fluids of the present disclosure in an amount in the range of from about 5 pounds per barrel to about the salt saturation limit of the treatment fluid.

In embodiments, the treatment fluids of the present disclosure can include thermally stable core-shell particles, shale inhibitor, and salt. In some such embodiments, the treatment fluids can provide for reduced pore pressure transmission. In embodiments, the treatment fluids of the present disclosure can reduce pore pressure transmission by increasing the amount of time required for the pore pressure to equilibrate. In embodiments, the treatment fluids of the present disclosure can increase the amount of time required for pore pressure equilibration by about 1.5 times to about 2.5 times the amount of time required for a baseline fluid without the thermally stable core-shell particles of the present disclosure. In embodiments, the treatment fluids of the present disclosure can reduce pore pressure transmission by lowering the equilibrium pressure. In embodiments, the treatments fluids of the present disclosure can lower the equilibrium pressure by about 100 psi to about 500 psi.

In embodiments, the treatment fluids used in the methods and systems of the present disclosure optionally may include one or more weighting agents, among other purposes, to provide a treatment fluid of the desired weight and/or density for the subterranean formation in which it is used. Examples of weighting agents that may be suitable in embodiments include but are not limited to, barites (barium sulfate), hematite, carbonate coated hematite, iron ores, siderite, ilmenite, galena, carbonates (e.g., calcium carbonate, magnesium carbonate, iron carbonate, zinc carbonate), manganese tetraoxide, chloride salts (e.g., NaCl, KCl, $CaCl_2$)), formate salts, or a combination thereof. These weighting agents can be at least partially soluble or insoluble in the treatment fluid. The weighting agents can be included in a treatment fluid in any amount needed to impart the desired properties to the fluid. In embodiments, a weighting agent can be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, etc.). In embodiments, the weighting agents can be present in the treatment fluids in an amount of from about 1% to about 35% by weight of the treatment fluid. In embodiments, the weighting agent can be present in the treatment fluids in an amount of from about 1% to about 10% by weight of the treatment fluid.

In embodiments, the treatment fluids used in the methods and systems of the present disclosure can optionally include one or more viscosifiers, which may include any substance that is capable of increasing the viscosity of a fluid, for example, by forming a gel. In embodiments, the viscosifier can comprise a biopolymer such as guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), xanthan, scleroglucan, diutan, alginate, carrageenan, welan gum, gellan gum, pectin, polyuronides, glucomannan, starches, or chitosans. In embodiments, the viscosifier can comprise one or more clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and/or derivatives thereof. In embodiments, the viscosifiers can be "crosslinked" with a crosslinking agent, among other reasons, to impart enhanced viscosity and/or suspension properties to the fluid. The viscosifiers can be included in any concentration sufficient to impart the desired viscosity and/or suspension properties to the fluid. In embodiments, the viscosifier can be included in an amount of from about 0.1% to about 10% by weight of the fluid. In embodiments, the viscosifier can be present in the range of from about 0.1% to about 5% by weight of the fluid. In embodiments, the treatment fluids including thermally stable core-shell particles of the present disclosure and a viscosifier can provide greater fluid loss control than a treatment fluid with only the core-shell particles or viscosifier alone.

In embodiments, the treatment fluids used in the methods and systems of the present disclosure optionally may include any number of additional additives. Examples of such additional additives include, but are not limited to, salts, surfactants, acids, proppant particulates, diverting agents, filtration agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional shale inhibitors, $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In embodiments, one or more of these additional additives (e.g., a crosslinking agent) may be added to the treatment fluid and/or activated after the viscosifying agent has been at least partially hydrated in the fluid.

The treatment fluid can have desirable properties that can affect the pumpability and suspending capability of the fluid. The treatment fluid can have a plastic viscosity in the range of 10 to 90 centipoise (cP), or 20 to 70 cP at a temperature of 120° F. (48.9° C.). The plastic viscosity can also be in a range such that the treatment fluid is pumpable. The treatment fluid can have a yield point in the range of 2 to 60 pounds per 100 sq. ft. (lb/100 $ft^2$) (0.96 to 28.7 Pa) at a temperature of 120° F. (48.9° C.). The treatment fluid can also have a yield point in a range such that insoluble materials are suspended in the base fluid. The treatment fluid can have a 10 sec gel strength in the range of 1 to 30 lb/100 $ft^2$ (0.48 to 14.4 Pa) and a 10 min gel strength in the range of 1 to 50 lb/100 $ft^2$ (0.48 to 23.9 Pa) at a temperature of 120° F. (48.9° C.). The treatment fluid can have a density in the range of 6 to 20 pounds per gallon (ppg) (0.72 to 2.4 kilograms per liter (kg/L)).

The thermally stable core-shell particles of this disclosure can be provided in a drilling or treatment fluid in any suitable amount. In embodiments, the thermally stable core-shell particles of this disclosure can be included in the treatment fluid in a concentration of from about 0.1 pounds per barrel (lb/bbl) to about 20 lb/bbl. In embodiments, the thermally stable core-shell particles can be included in the treatment fluid in an concentration of from about 2 lb/bbl to about 15 lb/bbl. In embodiments, the thermally stable core-shell particles can be included in the treatment fluid in an concentration of from about 2 lb/bbl to about 12 lb/bbl. In embodiments, the thermally stable core-shell particles can be included in the treatment fluid in an concentration of from about 5 lb/bbl to about 10 lb/bbl. Suitable amounts of the thermally stable core-shell particles can be included in a drilling or treatment fluid of the present disclosure based on, among other things, the amount and/or reactivity of (e.g., shale in) the formation, other components of the treatment fluid (e.g., brines), the desired viscosity of the drilling or treatment fluid, and other parameters of the operation.

In embodiments, the drilling and treatment fluids of the present disclosure can form a thin, degradable filter cake in a subterranean formation. In embodiments, the drilling and treatment fluids of this disclosure can be less invasive to the formation yet provide lubricity, effective fluid loss control, and good filter cake sealing and plastering characteristics. In embodiments, the present disclosure provides an aqueous-based drilling or treatment fluid that includes the thermally stable core-shell particles. In embodiments, the present disclosure provides drilling or treatment fluids that include an aqueous base fluid (e.g., a brine or fresh water), and thermally stable core-shell particles of this disclosure. In embodiments, the thermally stable core-shell particles of the present disclosure provide enhanced fluid loss control (e.g., by mixing with other components, such as bridging agents to form the filter cake). In embodiments, the thermally stable core-shell particles of the present disclosure can reduce fluid loss by about 20% to about 80%. In embodiments, the thermally stable core-shell particles of the present disclosure may reduce fluid loss by about 30% to about 70%. In embodiments, the thermally stable core-shell particles of the present disclosure can reduce fluid loss by about 40% to about 65%.

The treatment fluids of the present disclosure can be prepared using any suitable method and/or equipment (e.g., blenders, mixers, stirrers, etc.) known in the art at any time prior to their use. The treatment fluids can be prepared at least in part at a well site or at an offsite location. In embodiments, the thermally stable core-shell particles and/or other components of the treatment fluid can be metered directly into a base treatment fluid to form a treatment fluid. In embodiments, the base fluid can be mixed with the thermally stable core-shell particles and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In embodiments, the treatment fluids of the present disclosure can be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in embodiments provides methods for using the treatment fluids to carry out a variety of subterranean treatments, including but not limited to, hydraulic fracturing treatments, acidizing treatments, and drilling operations. In embodiments, the treatment fluid such as a drilling fluid of the present disclosure may be introduced into at least a portion of a wellbore as it is drilled to penetrate at least a portion of a subterranean formation. In embodiments, the subterranean formation can be a low or ultra-low permeability (e.g., shale) formation. The drilling fluid can be circulated in the wellbore during drilling, among other reasons, to cool and/or lubricate a drill bit and/or drill pipe to prevent them from sticking to the walls of the wellbore, prevent blowouts by serving as a hydrostatic head to counteract the sudden entrance into the wellbore of high pressure formation fluids, suspend or remove formation cuttings from the wellbore, and/or enhance the stability of the wellbore during drilling.

The treatment fluids and thermally stable core-shell particles disclosed herein may directly or indirectly affect one or more components or pieces of equipment associated with the preparation, delivery, recapture, recycling, reuse, and/or disposal of the disclosed treatment fluids and thermally stable core-shell particles. For example, and with reference to FIG. 1, the disclosed treatment fluids and thermally stable core-shell particles may directly or indirectly affect one or more components or pieces of equipment associated with an exemplary wellbore drilling assembly 100, according to embodiments of this disclosure. It should be noted that while FIG. 1 generally depicts a land-based drilling assembly, the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, the fluid processing unit(s) 128 may be arranged at any other location in the drilling assembly 100 to facilitate its proper function, without departing from the scope of the scope of the disclosure.

The disclosed thermally stable core-shell particles can be added to the drilling fluid 122 via a mixing hopper 134 communicably coupled to or otherwise in fluid communication with the retention pit 132. The mixing hopper 134 may include, but is not limited to, mixers and related mixing equipment. In other embodiments, however, the disclosed thermally stable core-shell particles may be added to the drilling fluid 122 at any other location in the drilling assembly 100. In embodiments, for example, there could be more than one retention pit 132, such as multiple retention pits 132 in series. Moreover, the retention put 132 may be representative of one or more fluid storage facilities and/or units where the disclosed thermally stable core-shell particles or an additive comprising same can be stored, reconditioned, and/or regulated until added to the drilling fluid 122.

As mentioned above, the disclosed thermally stable core-shell particles may directly or indirectly affect the components and equipment of the drilling assembly 100. For example, the disclosed thermally stable core-shell particles may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the thermally stable core-shell particles.

The disclosed thermally stable core-shell particles may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids and thermally stable core-shell particles may also directly or indirectly affect the mixing hopper 134 and the retention pit 132 and their assorted variations.

The disclosed treatment fluids and/or thermally stable core-shell particles may also directly or indirectly affect the various downhole equipment and tools that may come into contact with the treatment fluids and thermally stable core-shell particles, such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treat treatment fluids and/or thermally stable core-shell particles may also directly or indirectly affect any downhole heat exchangers, valves and corresponding actuation devices, tool seals, packers and other wellbore isolation devices or components, and the like associated with the wellbore 116. The disclosed treatment fluids and/or thermally stable core-shell particles may also directly or indirectly affect the drill bit 114, which may include, but is not limited to, roller cone bits, PDC bits, natural diamond bits, any hole openers, reamers, coring bits, etc.

The methods can include mixing the base fluid and the core-shell particles (and any additional components) together. According to any of the embodiments, the methods include the step of introducing the treatment fluid into a subterranean formation. The subterranean formation can be penetrated by a wellbore. The well can be an oil, gas, or water production well, a geothermal well, or an injection well. The well can be an onshore well or an offshore well. The well includes the wellbore. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The well can include an annulus. The step of introducing the treatment fluid can include introducing the treatment fluid into a portion of the annulus. The treatment fluid can also be a spacer fluid, a completion fluid, a workover fluid, a stimulation fluid, a packer fluid, an insulating fluid, a well-bore cleaning fluid, or a cement composition. The methods can also include introducing one or more additional fluids before and/or after the step of introducing the treatment fluid.

An embodiment of the present disclosure is a treatment fluid comprising a base fluid and (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker, and (b) a carrier fluid. Thermally stable indicates that inclusion of the thermally stable component (e.g., the thermally stable monomer(s) and/or the thermally stable cross-linker(s)) in the wellbore servicing composition provides for stability of the core-shell particles (e.g., maintenance of association of the core with the shell of the core-shell particles, maintenance of cross-linking between the core and the shell, maintenance of association of the polymer shell with the core in the absence of cross-linking in embodiments without cross-linker(s), etc.) at temperatures of greater than or equal to at least about 300, 325, or 350° F. (148.9, 162.8, or 176.7° C.).

Optionally, the treatment fluid is a drilling fluid. Optionally, the base fluid comprises a hydrocarbon liquid, water, or a combination of a hydrocarbon liquid and water. Optionally, the plurality of core-shell particles are made from inorganic core materials selected from amorphous or crystalline silica, barite, iron oxide, titanium oxide, calcium carbonate, or combinations thereof. Optionally, the plurality of particles has a particle size distribution of a d50 value in the range of 50 to 250 nm. Optionally, the treatment fluid forms a filter cake on a wellbore wall of a subterranean formation or seals exposed surfaces of the subterranean formation. Optionally, the plurality of core-shell particles stabilizes a water-sensitive subterranean formation. Optionally, the polymer of the polymeric shell is selected from or includes one or more thermally stable polymers described herein and/or a non-thermally stable polymer, such pectin, alginate, as, polyesters, polyamides, carrageenan, guar, carboxymethyl carboxymethylcellulose, hydroxyethyl guar, xanthan, diutan, carboxymethylhydroxylcellulose, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), inulin, starch, cellulose, guar gum, hydroxyethyl cellulose, hydroxypropyl guar gum, lignin, lignite, polysaccharides containing glucose, mannose, and glucuronic acid units, sodium carboxymethylcellulose, sodium lignosulfonate, whey, xanthan gum, or hydroxypropylated cross-linked corn starch. Optionally, the polymeric shell increases a thermal stability, alters the wettability, or prevents aggregation of the core particles, or protects the core particles against contaminants in the treatment fluid or a reservoir fluid. Optionally, the polymeric shell has tackifying properties. Optionally, the treatment fluid has a total filtrate loss of less than 50, 30, or 15 milliliters using a particle plugging test with a disk having 12 micrometer pores at testing conditions of a pressure differential of 1,200 psi (8.3 megapascals) and a temperature of 180° F. (82.2° C.). Optionally, the treatment fluid has an API spurt loss of less than 5, 3, or 1 milliliters using a particle plugging test with a disk having 12 micrometer pores at testing conditions of a pressure differential of 1,200 psi (8.3 megapascals) and a temperature of 180° F. (82.2° C.). Optionally, the core-shell particles stabilizing additive is in a concentration in the range of 1 to 35 pounds per barrel (3.9 to 135.3 kilograms per cubic meter), 2 to 15 pounds per barrel (7.7 to 57.8 kilograms per cubic meter), or 5 to 10 pounds per barrel (19.3 to 38.5 kilograms per cubic meter). The treatment fluid can further comprise other additives, such as one or more selected from ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; ground nut shells; ground seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; ingredients that chemically react to form a cementitious substance selected from diatomaceous earth and lime; a viscosifier; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; starch; modified crosslinked starches; carboxymethyl cellulose (CMC); polyanionic cellulose (PAC); or combinations thereof, in any proportion. Optionally, the treatment fluid has a density in the range of 6 to 20 pounds per gallon (0.72 to 2.4 kilograms per liter), 8 to 18 pounds per gallon (0.96 to 2.2 kilograms per liter), or 9 to 16 pounds per gallon (1.1 to 1.9 kilograms per liter).

In embodiments, a method of this disclosure comprises treating a portion of a subterranean formation by introducing a treatment fluid as described herein into the subterranean formation; and causing or allowing the plurality of core-shell particles to stabilize and reduce fluid loss into permeable areas of the subterranean formation. In embodiments, a method of this disclosure comprises: preparing a wellbore servicing composition comprising: (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker; and (b) a carrier fluid; and placing the wellbore servicing composition into the wellbore, the subterranean formation or both, wherein thermally stable indicates that inclusion in the wellbore servicing composition of the thermally stable component (e.g., the thermally stable monomer(s) and/or the thermally stable cross-linker(s)) provides for stability of the core-shell particles (e.g., maintenance of association of the core with the shell of the core-shell particles, maintenance of cross-linking between the core and the shell) at temperatures of greater than or equal to at least about 300, 325, or 350° F. (148.9, 162.8, or 176.7° C.). The polymeric shell can wholly or partially surround the core of the core-shell particles. Optionally, the plurality of core particles can be coated with the polymeric shell prior to introduction of the treatment fluid into the subterranean formation. The polymer of the shell that wholly or partially coats the core of the core-shell particle can be formed prior to or in situ during introduction of the treatment fluid into the subterranean formation. The treatment fluid can be a drilling fluid. The base fluid can comprise a hydrocarbon liquid, water, or a combination of a hydrocarbon liquid and water. The core of the plurality of core-shell particles can be made from or comprise organic or inorganic materials, such as selected from amorphous or crystalline silica, barite, iron oxide, titanium oxide, calcium carbonate, or combinations thereof. The core particles and/or core-shell particles can have a desired/selected particle size distribution. In embodiments, the treatment fluid forms a filter cake on a wellbore wall of a subterranean formation or seals exposed surfaces of the subterranean formation. The core-shell particles can stabilize a water-sensitive subterranean formation, in embodiments. The polymer of the polymeric shell can be or comprise one or more polymers formed from thermally stable monomers described herein and/or non-thermally stable polymers, such as polyesters, polyamides, carrageenan, pectin, alginate, carboxymethylcellulose, guar, carboxymethyl hydroxypropyl guar, carboxymethyl hydroxyethyl guar, xanthan, diutan, carboxymethylhydroxylcellulose, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), inulin, starch, cellulose, guar gum, hydroxyethyl cellulose, hydroxypropyl guar gum, lignin, lignite, polysaccharides containing glucose, mannose, and glucuronic acid units, sodium carboxymethylcellulose, sodium lignosulfonate, whey, xanthan gum, or hydroxypropylated cross-linked corn starch. The thermally stable cross-linker(s) and/or monomer(s) used to form the polymeric shell can increase a thermal stability, alter the wettability, and/or prevent aggregation of the core particles, and/or protect the particles against contaminants in the treatment fluid or a reservoir fluid. The polymeric shell can have tackifying properties. In embodiments, the treatment fluid provides a total filtrate loss of less than 50, 30, or 15 milliliters using a particle plugging test with a disk having 12 micrometer pores at testing conditions of a pressure differential of 1,200 psi (8.3 megapascals) and a temperature of 180° F. (82.2° C.). In embodiments, the treatment fluid can have an API spurt loss of less than 5, 3, or 1 milliliters using a particle plugging test with a disk having 12 micrometer pores at testing conditions of a pressure differential of 1,200 psi (8.3 megapascals) and a temperature of 180° F. (82.2° C.). The core-shell particles can be present in the wellbore treatment fluid in a concentration in the range of 1 to 35, 2 to 15, or 5 to 10 pounds per barrel (3.9 to 135.3, 7.7 to 57.8, or 19.3 to 38.5 kilograms per cubic meter). The treatment fluid can further comprises other additives, such as, without limitation, ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; ground nut shells; ground seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; ingredients that chemically react to form a cementitious substance selected from diatomaceous earth and lime; a viscosifier; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; starch; modified crosslinked starches; carboxymethyl cellulose (CMC); polyanionic cellulose (PAC); or a combination thereof, in any proportion. In embodiments, the treatment fluid has a density in the range of 6 to 20, 8 to 18, or 9 to 16 pounds per gallon (0.72 to 2.4, 0.96 to 2.2, or 1.1 to 1.9 kilograms per liter).

An embodiment of the present disclosure is a method including providing a treatment fluid including an aqueous base fluid, thermally stable core-shell particles of this disclosure, and optionally additional additive(s) (e.g., a viscosifier); introducing the treatment fluid into at least a portion of a subterranean formation to contact at least a portion of the subterranean formation; and allowing the treatment fluid to reduce fluid loss into the subterranean formation.

In embodiments of the present disclosure, a method comprises providing a treatment fluid including an aqueous base fluid and thermally stable core-shell particles of this disclosure, optional additional additives (e.g., a shale inhibitor, and a salt); introducing the treatment fluid into at least a portion of a subterranean formation to contact at least a portion of the subterranean formation; and allowing the core-shell particles to reduce a pore pressure transmission.

In embodiments of the present disclosure, a method comprises providing a treatment fluid including an aqueous base fluid and thermally stable core-shell particles, optional additional components (e.g., a bridging agent, a shale inhibitor, and a salt); introducing the treatment fluid into at least a portion of a subterranean formation to contact at least a portion of the subterranean formation; and allowing the core-shell particles to reduce a pore pressure transmission. The method can further comprise allowing the core-shell particles to become incorporated into a filter cake located on a surface within the subterranean formation. The treatment fluid can be introduced into the portion of the subterranean formation using one or more pumps.

In embodiments, a method of this disclosure comprises: providing a treatment fluid comprising an aqueous base fluid, thermally stable core-shell particles of this disclosure, optionally a viscosifier (e.g., comprising polyanionic cellulose), a shale inhibitor, and/or a salt; introducing the treatment fluid into at least a portion of a subterranean formation to contact at least a portion of the subterranean formation; and allowing the core-shell particles and optional viscosifier to reduce a pore pressure transmission.

In embodiments, a method of treating a portion of a subterranean formation comprises: introducing a wellbore servicing composition into the subterranean formation, wherein the wellbore servicing composition comprises: a base fluid; and core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker; and causing or allowing the wellbore servicing fluid to stabilize and/or reduce fluid loss into permeable areas of the subterranean formation. The cores of the core-shell particles can be coated with the polymeric shell prior and/or during to introduction of the wellbore servicing composition into the subterranean formation.

Cementing is utilized during various phases of wellbore operations. For example, cement can be utilized to isolate or secure casing strings and/or liners in a well. In applications, cementing can be utilized in remedial operations, such as to repair casing and/or to achieve formation isolation. In other applications, cementing can be utilized during well abandonment.

The core-shell composites of this disclosure can be useful as cement fluid loss additives to prevent cement slurry components from migrating into rock formations after application of a freshly mixed cement and prior to curing. Migration can create formation damage, which can subsequently affect oil production. Migration also results in a loss of slurry, which can lead to considerable expense in both the drilling and cementing operations. Cement operations performed in wellbores under high stress conditions can present particular problems, such as difficulty in obtaining good wellbore isolation and/or maintaining mechanical integrity of the wellbore over the life of the well.

As used herein, the term "dry cement" indicates a particulate cement prior to the addition of water. In embodiments, the core-shell particles of this disclosure can be combined with a dry cement, such as Portland cement powder, and a water source to form a cement composition of this disclosure. During subsequent curing reaction, the cement compositions can have superior fluid retention properties when compared to conventional cements. This can be a significant factor in providing proper cure of the cement, which reacts with the water to form a strong cured matrix. The cement compositions can also be effective at substantially preventing migration of solids into rock formations during cure.

As used herein, the term "water source" can refer to a source of water comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context. In embodiments, a water source can include one or more salts, ions, buffers, acids, bases, surfactants, or other dissolved, dispersed, or emulsified compounds, materials, components, or combinations thereof. In some embodiments, a water source can include about 0 wt % to 30 wt % total dissolved solids. The term "water-based" or "water solution" generally refers to a composition including a water source. Generally and as determined by context, the term "water source" can include a high total dissolved solids (TDS) water source, high temperature water sources, and high total dissolved solids, high temperature water sources.

In embodiments, the cement compositions of this disclosure comprise or consist essentially of water, cement, and core-shell particles as described herein.

Components of the cement composition can be suitably added in any order, with agitation suitable to form a suitable cement composition for one or more construction purposes. In embodiments, the core-shell particles are employed in water/oil (w/o) latex form, and can be added directly to a water source and cement to form a cement composition of this disclosure. In embodiments, the composites latex can be spray dried or dried and ground to form a fine powder, and the powder can be added to the cement and a water source to form the cement composition of this disclosure. In embodiments, a dispersion of the core-shell composite can be formed by dispersion polymerization and added to the cement to form a cement composition of this disclosure; in such embodiments, the dispersion can supply the water to cause the cement to cure; in other embodiments, additional water can be added to facilitate the core-shell composite formation.

The core-shell composites useful in the cement compositions of this disclosure can comprise, consist essentially of, or consist of nano- and/or microparticulate cores having crosslinked polymer shells, wherein the (a) core-shell particles comprise a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker; and wherein thermally stable indicates that inclusion of the component denoted as "thermally stable" provides for stability of the core-shell particles (e.g., maintenance of association of the core with the shell of the core-shell particles, maintenance of cross-linking between the core and the shell) at temperatures of greater than or equal to at least about 300, 325, or 350° F. (148.9, 162.8, or 176.7° C.). The core-shell composite particles can be present in the cement compositions of this disclosure at about 0.5 wt % to 5 wt % of the cement composition, or about 0.7 wt % to 5 wt %, or about 1 wt % to 5 wt %, or about 0.5 wt % to 3.5 wt %, or about 0.5 wt % to 3 wt %, or about 0.5 wt % to 2.5 wt %, or about 0.5 wt % to 2 wt % of the cement composition.

The dry cement can be present in the cement compositions of this disclosure at about 30 wt % to 80 wt % of the composition, or about 40 wt % to 80 wt %, or about 50 wt % to 80 wt %, or about 60 wt % to 80 wt %, or about 50 wt % to 70 wt %, or about 60 wt % to 70 wt % of the cement composition.

The core-shell particles can comprise a single particle composition or two or more particle compositions, as selected in the synthesis as described herein. In embodiments, two or more core-shell composite sources are blended in a single cement, wherein the core-shell composite sources are different.

In embodiments, the core-shell particles of this disclosure can be combined with a water source (and optionally one or more additives as described herein or otherwise known, such as a bridging agent) to form a drilling fluid of this disclosure.

The drilling fluids of this disclosure can provide superior fluid retention properties relative to conventional drilling fluids. The drilling fluids can also be effective at substantially preventing migration of solids into rock formations during drilling operations.

In embodiments, the drilling fluids of this disclosure comprise or consist essentially of water; calcium carbonate; and core-shell particles as described herein.

Again, no special methods are required to form the drilling fluids of this disclosure; components can be suitably added in any order, with agitation suitable to form a suitable drilling mud or fluid. In embodiments, the core-shell particles of this disclosure are employed in w/o latex form, and added directly to the water source and any additional components/additives to form the drilling fluid. In embodiments, the core-shell composites latex can be spray dried or otherwise dried and ground to form a fine powder, and the powder can be added to the water source and any other components to form the drilling fluid of this disclosure.

The core-shell particles useful in the drilling fluid compositions of this disclosure can comprise, consist essentially of, or consist of particulate cores having crosslinked polymer shells, as described herein. When added to a water source and optionally one or more additional components (e.g., bridging materials), the core-shell particulates can act as fluid loss control agents drilling operation(s). The core-shell particles can be present in the drilling fluids of this disclosure at about 0.5 wt % to 5 wt % of the drilling fluid, or about 0.7 wt % to 5 wt %, or about 1 wt % to 5 wt %, or about 1.3 wt % to 5 wt %, or about 1.5 wt % to 5 wt %, or about 1.7 wt % to 5 wt %, or about 2.0 wt % to 5 wt %, or about 0.5 wt % to 3.5 wt %, or about 0.5 wt % to 3 wt %, or about 0.5 wt % to 2.5 wt %, or about 0.5 wt % to 2 wt %, or about 1 wt % to 4 wt %, or about 1 wt % to 3 wt % of the drilling fluid.

In embodiments, a core-shell composite source can be the product of a single core-shell particles synthesis. In embodiments, a single core-shell composite source can be employed in a drilling fluid of this disclosure. The core-shell composite source can have a single particle size distribution or a bimodal or higher modal distribution, as selected during the synthesis, as described herein. As described herein, the core-shell composite source can include a single core-shell particle composition or two or more core-shell particle compositions, as selected during the synthesis. In embodiments, two or more core-shell composite sources can be blended in a single drilling fluid, wherein the core-shell composite sources are different. Accordingly, in embodiments, two or more core-shell composite sources having different particle size distributions, different particle compositions, different polymer content, different ratios of polymer to particulate core, or composite sources having two or more such differences can advantageously be selected and blended, in any ratio, in a single drilling fluid of this disclosure. The ability to easily control the core-shell particles content of the drilling fluids of this disclosure can be an advantage, because different reservoirs can have different rock porosities, fracture sizes, and/or pore sizes. The ability to select and optionally blend composite sources with ease can facilitate optimization of drilling fluids to address different particle packing requirements in the field. The different core-shell composite sources can advantageously be blended during a manufacturing or packaging step, or in situ in the field.

The drilling fluids of this disclosure can comprise one or more core-shell particles sources, a water source, and optionally additional components/additives (e.g., a bridging agent). Bridging agents are particulate solids added to a drilling fluid to bridge across the pore throat or fractures of an exposed rock, thus forming a filter cake to prevent loss of whole mud or excessive filtrate. Common bridging agents for reservoir applications can include calcium carbonate, suspended salt, and/or oil-soluble resins. The particle size of the bridging agent can be selected as desired. In embodiments, selection can be based on criteria; for example, particle size of the bridging agent can be selected to be about one-third of the average pore size of the rock formation being addressed.

When present, the bridging agent can be present in the drilling fluid/mud compositions of this disclosure at about 10 wt % to 30 wt % of the composition, or about 10 wt % to 25 wt %, or about 10 wt % to 20 wt %, or about 10 wt % to 15 wt %, or about 11 wt % to 30 wt %, or about 12 wt % to 30 wt %, or about 13 wt % to 30 wt %, or about 14 wt % to 30 wt %, or about 15 wt % to 30 wt %, or about 12 wt % to 20 wt % of the drilling fluid/mud compositions.

This application can utilize polymer gels or other materials to divide, seal or separate the flow in two different sections of a reservoir. The core-shell particles of this disclosure can be useful for temporarily blocking a layer or section of the reservoir for the purpose of isolation and can reduce the migration of water to the desired targeted section.

Combinations of core-shell particle composites and cationic starch can be useful as paper fillers and for preventing migration and settling in water-based furnishes used for papermaking. Such applications include the use of papermaking processes and equipment for making nonwoven articles such as filter media.

The core-shell particles of this disclosure can be useful as flocculating agents and clarifiers in processes such as papermaking and water treatment. In some such embodiments, the core-shell particles can include a cationically charged ionic polymer shell.

As discussed hereinabove, in embodiments, the drilling fluids of this disclosure are utilized in one or more drilling operations. In embodiments, the drilling methods involve application of the drilling fluid to a wellbore of a hydrocarbon-bearing rock formation, contemporaneously with drilling within the wellbore. The drilling fluids can be added to the wellbore to facilitate the drilling process by suspending cuttings, controlling pressure, stabilizing exposed rock, providing buoyancy, and/or cooling and lubricating. In embodiments, the drilling fluids of this disclosure do not substantially adsorb to rock formations in the well and as a result do not substantially clog the pores of the rock formation. Fluid loss control can thus be obtained, in embodiments, without any observed gelation or caking of the fluid, such as within a wellbore.

The drilling fluids of this disclosure can have superior properties of fluid loss control compared to conventional water-based fluid loss additives, such as starch. For example, when measured according to API Recommended Procedure 13B-1, the drilling fluids of this disclosure can result in less than about 10, 5, or 3 mL fluid loss at HPHT conditions including temperatures above 100° C., for example 100° C. to 200° C., or about 100° C. to 190° C., or about 100° C. to 180° C., or about 100° C. to 170° C., or about 110° C. to 200° C., or about 120° C. to 200° C., or about 130° C. to 200° C., or about 140° C. to 200° C., or about 150° C. to 200° C., or about 120° C. to 180° C. HPHT conditions can include pressures of at least 65, 68, or 69 MPa. In such testing, fluid loss of the drilling fluids of this disclosure can be about 1 mL to 10 mL, or about 1 mL to 9 mL, or about 1 mL to 8 mL, or about 1 mL to 7 mL, or about 1 mL to 6 mL, or about 1 mL to 5 mL, or about 2 mL to 10 mL, or about 3 mL to 10 mL, or about 4 mL to 10 mL, or about 5 mL to 10 mL, or about 5 mL to 9 mL, or about 5 mL to 8 mL, or about 5 mL to 7 mL.

In some such tests, the drilling fluids of this disclosure can be heat aged at a temperature of 120° C. to 150° C. for 16 hours or more prior to the fluid loss testing, wherein the fluid loss test results before and after the heat aging (hot rolling) can be substantially the same or lower, thus representing improved fluid loss performance, after being subjected to the heat aging. In other tests, the drilling fluids of this disclosure can be heat aged at a temperature of 150° C. to 170° C. for 16 hours or more prior to the fluid loss testing, wherein the fluid loss test results before and after the heat aging reflect the thermal stabilization provided by the presence of the core-shell particles of this disclosure. The presence of the herein disclosed thermally stable core-shell particles can improve the performance of the core-shell particles in high temperature applications, and, for example, both before and after heat aging (e.g., at 150° C. to 170° C.). In embodiments, even after 16 hours of heat aging, the core-shell particles of this disclosure can undergo less than about 10, 5, or 3 mL fluid loss at HPHT conditions. As used herein, the term “high temperature” can indicate temperatures of about 80° C. to 350° C., as specified or determined by context.

In embodiments, a method of this disclosure comprises introducing a drilling fluid of this disclosure to a wellbore, and carrying out a drilling operation in the wellbore. In embodiments, the drilling can be intermittent, that is, drilling can be carried out for periods of time, in between which drilling can be stopped. In embodiments, the temperature within a portion of the wellbore can be in a range of from about 60° C. to 250° C., from about 90° C. to about 200° C., or from about 120° C. to about 180° C. In embodiments, the wellbore comprises a water source having high total dissolved solids (TDS). As used herein, the term “high total dissolved solids” can refer to a water source including at least about 4 wt % solids dissolved therein, and in embodiments up to about 30 wt % solids dissolved therein.

The drilling fluids of this disclosure can be effective to prevent fluid loss in one or more wellbores during drilling. The drilling fluids of this disclosure can minimize or substantially prevent fluid loss during intermittent drilling. The drilling fluids of this disclosure may not undergo substantial gelation or caking within the wellbore during drilling or during intermittent drilling, but can still provide effective fluid loss prevention in and around rock surfaces and/or fissures and/or cracks in the rock.

Among the many potential advantages to the methods and compositions of the present disclosure, only some of which are alluded to herein, may provide reduced fluid loss and/or reduced pore pressure transmission. The core-shell particles of this disclosure can exhibit improved thermal stability relative to conventional composites, thus extending the capability of currently used core particles.

When employed as a component of a treatment fluid (e.g., drilling fluid), the core-shell particles may provide improved fluid loss properties in mud drilling applications, decreasing the initial spurt and the total filtrate volume in fluid loss tests. When employed as a component of a treatment fluid (e.g., that includes shale inhibitors and salts), the core-shell particles may provide reduced pore pressure transmission (e.g., in shale formations). In embodiments, combining the core-shell particles with one or more additional additives may have a synergistic effect on the fluid loss control capabilities of the treatment fluid.

To facilitate a better understanding of the present disclosure, the following examples of certain aspects of embodiments are given. The following examples are not the only examples that could be given according to the present disclosure and are not intended to limit the scope of the disclosure or claims.

Additional Disclosure

The following are non-limiting, specific embodiments in accordance with the present disclosure:

In a first embodiment, a method of servicing a wellbore penetrating a subterranean formation comprises: preparing a wellbore servicing composition comprising: (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker; and (b) a carrier fluid; and placing the wellbore servicing composition into the wellbore, the subterranean formation or both, wherein thermally stable indicates that inclusion of the thermally stable monomer, the thermally stable cross-linker, or both the thermally stable monomer and the thermally stable cross-linker in the wellbore servicing composition provides for stability of the core-shell particles (e.g., maintenance of association of the core with the shell of the core-shell particles, maintenance of cross-linking between the core and the shell) at temperatures of greater than or equal to at least about 300, 325, or 350° F. (148.9, 162.8, or 176.7° C.).

A second embodiment can include the method of the first embodiment, wherein the wellbore servicing composition comprises from about 0.1 to about 15, from about 1 to about 12, or from about 1.5 to about 10 lb/bbl of the core-shell particles.

A third embodiment can include the method of the first or second embodiment, wherein the wellbore servicing composition is an aqueous based drilling fluid or a non-aqueous based drilling fluid.

A fourth embodiment can include the method of the third embodiment, wherein placing of the wellbore servicing composition in the wellbore, the subterranean formation, or both provides filtration control and/or reduction of fluid loss.

A fifth embodiment can include the method of the third or the fourth embodiment, wherein the drilling fluid further comprises a viscosifier, a salt, a shale inhibitor, a cement, weighting agent, pH modifier corrosion inhibitor, antioxidant, or a combination thereof.

A sixth embodiment can include the method of any one of the first to fifth embodiments, wherein the one or more cross-linkers include the thermally stable cross-linker.

A seventh embodiment can include the method of the sixth embodiment, wherein thermally stable indicates that greater than or equal to 90% of covalent bonds in the crosslinker remain intact after exposure to temperatures up to 350° F. in an aqueous environment for 16 hours.

An eighth embodiment can include the method of the sixth or seventh embodiment, wherein the thermally stable cross-linker is selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, triallyl amine, triallylalkylammonium halide, tetraallylammonium halide, divinyl ether, diallyl ether, N-vinyl-3(E)-ethylidene pyrrolidone, ethylidene bis(N-vinylpyrrolidone), or a combination thereof.

A ninth embodiment can include the method of the eighth embodiment, wherein the cross-linker further includes a (conventional, non-thermally stable) cross-linker selected from acrylate or methacrylate diesters of diols such as glycols, acrylate or methacrylate diesters, triesters, or higher functionality esters of polyols including sugar alcohols (e.g. ethylene glycol, diethylene glycol, triethylene glycol, polyethylene glycol, propylene glycol, polypropylene glycol, glycerol, pentaerythritol, 1,1,1-trimethylolpropane, erythritol, sorbitol, and the like) and sugars, and bisacrylamide compounds such as N,N'-methylene bisacrylamide, vinyl or allyl esters (such as diallyl carbonate, divinyl adipate, divinyl sebacate, diallyl phthalate, diallyl maleate, diallyl succinate), 1,3,5-triallyl-1,3-5-triazine-2,4,6(1H,3H,5H)-trione, and triallyl cyanurate, or a combination thereof.

A tenth embodiment can include the method of any one of the first to ninth embodiments, wherein the polymer comprises an organic water soluble polymer or a crosslinked polymer.

An eleventh embodiment can include the method of any one of the first to tenth embodiments, wherein the one or more monomers include the thermally stable monomer.

A twelfth embodiment can include the method of the eleventh embodiment, wherein the thermally stable indicates that greater than or equal to 90% of covalent bonds in the monomer remain intact after exposure to temperatures up to 350° F. in an aqueous environment for 16 hours.

A thirteenth embodiment can include the method of any one of the first to twelfth embodiments, wherein the thermally stable monomer is selected from N-vinylpyrrolidone (NVP), vinylbenzenesulfonate, diallyldimethyl ammonium halide, 1-vinylimidazole, 4-vinylpyridine, or a combination thereof.

A fourteenth embodiment can include the method of any one of the first to thirteenth embodiments further comprising a monomer that is not thermally stable.

A fifteenth embodiment can include the method of the fourteenth embodiment, wherein the polymer comprises a crosslinked polymer, wherein the one or more monomers include: acrylamide, methacrylamide, N,N-dimethylacrylamide, N-isopropylacrylamide, an acrylic acid, a salt of an acrylic acid, 2-acryloylamino-2-methylpropane-1-sulfonic acid (AMPSA), a salt of AMPSA, dimethylaminopropyl methacrylamide (DMAPMA), methacrylamido propyltrimethylammonium chloride (MAPTAC), [3-(acryloylamino) propyl]trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC), or a combination thereof.

A sixteenth embodiment can include the method of any one of the eleventh to fifteenth embodiments, wherein the one or more cross-linkers include the thermally stable cross-linker.

A seventeenth embodiment can include the method of the sixteenth embodiment, wherein the thermally stable cross-linker indicates that greater than or equal to 90% of covalent bonds in the crosslinker remain intact after exposure to temperatures up to 350° F. in an aqueous environment for 16 hours.

An eighteenth embodiment can include the method of the sixteenth or seventeenth embodiment, wherein the thermally stable cross-linker is selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, triallyl amine, triallylalkylammonium halide, tetraallylammonium halide, divinyl ether, diallyl ether, N-vinyl-3(E)-ethylidene pyrrolidone, ethylidene bis(N-vinylpyrrolidone), or a combination thereof.

A nineteenth embodiment can include the method of the eighteenth embodiment, wherein the cross-linker further includes a (e.g., non-thermally stable) cross-linker selected from acrylate or methacrylate diesters of diols such as glycols, acrylate or methacrylate diesters, triesters, or higher functionality esters of polyols including sugar alcohols (e.g. ethylene glycol, diethylene glycol, triethylene glycol, polyethylene glycol, propylene glycol, polypropylene glycol, glycerol, pentaerythritol, 1,1,1-trimethylolpropane, erythritol, sorbitol, and the like) and sugars, and bisacrylamide compounds such as N,N'-methylene bisacrylamide, vinyl or allyl esters (such as diallyl carbonate, divinyl adipate, divinyl sebacate, diallyl phthalate, diallyl maleate, diallyl succinate), 1,3,5-triallyl-1,3-5-triazine-2,4,6(1H,3H,5H)-trione, and triallyl cyanurate, or a combination thereof.

A twentieth embodiment can include the method of any one of the sixteenth to nineteenth embodiments further comprising a monomer that is not thermally stable.

A twenty first embodiment can include the method of any one of the first to twentieth embodiments, comprising the inorganic particle, wherein the inorganic particle is selected from silica (e.g., crystalline silica, amorphous silica; treated fumed silica; partially treated fumed silica; colloidal silica; a silica-alumina composite particle, or a combination thereof), iron oxide, barite, alumina, zirconia, clays, calcium carbonate, titanium oxide (e.g., titania or titanium dioxide), carbon, lignite, surface-modified versions of the aforementioned, or a combination thereof.

A twenty second embodiment can include the method of any one of the first to twenty first embodiments, wherein the core comprises the organic particle, wherein the organic particle comprises a cellulosic particle (e.g., nut shells or other non-water soluble organic particles).

A twenty third embodiment can include the method of any one of the first to twenty second embodiments, wherein the core-shell particles (e.g., the core thereof) comprise primarily micro-particles (e.g., have an average or a median particle size (d50) of greater than or equal to about 1, 2, or 5 micrometers) or primarily nanoparticles (e.g., have an average particle size or a median particle size (d50) of less than or equal to about 10, 500, or 900 nanometers).

A twenty fourth embodiment can include the method of any one of the first to twenty fourth embodiments, wherein the core-shell particles (e.g., the cores thereof) have an average particle size or a median particle size (d50) in a range of from about 1 to about 1500, from about 1 to about 1000, or from about 50 to about 500 nm.

A twenty fifth embodiment can include the method of any one of the first to twenty fourth embodiments, wherein the core-shell particles have a particle size distribution with a d50 value in a range of 50 to about 250 nanometers.

A twenty sixth embodiment can include the method of any one of the first to twenty fifth embodiments, wherein the polymer is associated with the core via covalent or non-covalent interactions.

A twenty seventh embodiment can include the method of the twenty sixth embodiments, wherein the polymer is associated with the core via the covalent interactions, wherein the covalent interactions include silane chemistry, whereby the polymer is directly bonded to the surface of the particle of the core via silane bonding.

A twenty eighth embodiment can include the method of the twenty sixth or twenty seventh embodiment, wherein the polymer is associated with the core via the noncovalent interactions, wherein the non-covalent interactions include electrostatic interactions whereby the polymer is associated with the particle via electrostatic attraction.

A twenty ninth embodiment can include the method of the twenty eighth embodiment, wherein the polymer is not cross-linked.

A thirtieth embodiment can include the method of any one of the first to twenty ninth embodiments, wherein placing the wellbore servicing composition into the wellbore, the formation, or both comprises placing the wellbore servicing composition into the wellbore at a bottom hole temperature (BHT) of greater than or equal to at least about 300, 325, or 350° F. (148.9, 162.8, or 176.7° C.).

A thirty first embodiment can include the method of any one of the first to thirtieth embodiments, wherein during the placing of the wellbore servicing composition into the wellbore, the formation, or both, the wellbore servicing composition encounters water, a temperature of greater than or equal to about 300, 325, or 350° F. (148.9, 162.8, or 176.7° C.), or a combination thereof.

A thirty second embodiment can include the method of any one of the first to thirty first embodiments, wherein the wellbore servicing composition provides fluid loss control; well stability, cutting stability, pressure transmission reduction, or a combination thereof.

A thirty third embodiment can include the method of any one of the first to thirty second embodiments, wherein the wellbore servicing composition forms a filter cake on a wellbore wall of the subterranean formation or seals exposed surfaces of the subterranean formation.

A thirty fourth embodiment can include the method of any one of the first to thirty third embodiments, wherein the subterranean formation is water-sensitive, and wherein the core-shell particles stabilize the water-sensitive subterranean formation.

A thirty fifth embodiment can include the method of any one of the first to thirty fourth embodiments, wherein the polymer of the polymeric shell includes polyesters, polyamides, carrageenan, pectin, alginate, carboxymethylcellulose, guar, carboxymethyl hydroxypropyl guar, carboxymethyl hydroxyethyl guar, xanthan, diutan, carboxymethylhydroxylcellulose, carboxymethyl starch, hydroxypropyl starch, scleroglucan, welan gum, rhamzan, succinoglycan, polyglycolide, polycaprolactone, polybutylene succinate, chitosan, chitin, galactomannan, B-glucans, xylan, mannans, polyvinyl alcohol (PVA), inulin, starch, cellulose, guar gum, hydroxyethyl cellulose, hydroxypropyl guar gum, lignin, lignite, polysaccharides containing glucose, mannose, and glucuronic acid units, sodium carboxymethylcellulose, sodium lignosulfonate, whey, xanthan gum, or hydroxypropylated cross-linked corn starch, or a combination thereof.

In a thirty sixth embodiment, a wellbore servicing composition comprises: (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker; and (b) a carrier fluid.

A thirty seventh embodiment can include the wellbore servicing composition of the thirty sixth embodiment, wherein the wellbore servicing fluid is a drilling fluid.

A thirty eighth embodiment can include the wellbore servicing composition of the thirty seventh embodiment, wherein the wellbore servicing composition is an aqueous based drilling fluid or a non-aqueous based drilling fluid.

A thirty ninth embodiment can include the wellbore servicing composition of the thirty seventh embodiment, further comprising a viscosifier, a salt, a shale stabilizer, a cement, weighting agent, bridging agent, additional fluid loss agents or a combination thereof).

A fortieth embodiment can include the wellbore servicing composition of any one of the thirty sixth to thirty ninth embodiments, comprising from about 1 to about 15, from about 3 to about 12, or from about 5 to about 10 pounds per barrel (lb/bbl) of the core-shell particles.

A forty first embodiment can include the wellbore servicing composition of any one of the thirty sixth to fortieth embodiments, wherein placing of the wellbore servicing composition in the wellbore, the subterranean formation, or both provides filtration control and/or reduction of fluid loss.

A forty second embodiment can include the wellbore servicing composition of any one of the thirty sixth to forty first embodiments, wherein the one or more cross-linkers include the thermally stable cross-linker.

A forty third embodiment can include the wellbore servicing composition of the forty second embodiment, wherein the thermally stable cross-linker indicates that greater than or equal to 90% of covalent bonds in the crosslinker remain intact after exposure to temperatures up to 350° F. in an aqueous environment for 16 hours.

A forty fourth embodiment can include the wellbore servicing composition of the forty third embodiment, wherein the thermally stable cross-linker is selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, triallyl amine, triallylalkylammonium halide, tetraallylammonium halide, divinyl ether, diallyl ether, N-vinyl-3(E)-ethylidene pyrrolidone, ethylidene bis(N-vinylpyrrolidone), or a combination thereof.

A forty fifth embodiment can include the wellbore servicing composition of the forty fourth embodiment, wherein the cross-linker further includes a (conventional, non-thermally stable) cross-linker selected from acrylate or methacrylate diesters of diols such as glycols, acrylate or methacrylate diesters, triesters, or higher functionality esters of polyols including sugar alcohols (e.g. ethylene glycol, diethylene glycol, triethylene glycol, polyethylene glycol, propylene glycol, polypropylene glycol, glycerol, pentaerythritol, 1,1,1-trimethylolpropane, erythritol, sorbitol, and the like) and sugars, and bisacrylamide compounds such as N,N'-methylene bisacrylamide, vinyl or allyl esters (such as diallyl carbonate, divinyl adipate, divinyl sebacate, diallyl phthalate, diallyl maleate, diallyl succinate), 1,3,5-triallyl-1,3-5-triazine-2,4,6(1H,3H,5H)-trione, and triallyl cyanurate, or a combination thereof.

A forty sixth embodiment can include the wellbore servicing composition of any one of the thirty sixth to forty fifth embodiments, wherein the one or more monomers include the thermally stable monomer.

A forty seventh embodiment can include the wellbore servicing composition of the forty sixth embodiment, wherein the thermally stable monomer is indicated by greater than or equal to 90% of covalent bonds in the monomer remaining intact after exposure to temperatures up to 350° F. in an aqueous environment for 16 hours.

A forty eighth embodiment can include the wellbore servicing composition of any one of the thirty sixth to forty seventh embodiments, wherein the thermally stable monomer is selected from N-vinylpyrrolidone (NVP), vinylbenzenesulfonate, 1-vinylimidazole, 4-vinylpyridine, or a combination thereof.

A forty ninth embodiment can include the wellbore servicing composition of any one of the thirty sixth to forty eighth embodiments, further comprising a monomer that is not thermally stable.

A fiftieth embodiment can include the wellbore servicing composition of any one of the thirty sixth to forty ninth embodiments, wherein the one or more cross-linkers include the thermally stable cross-linker.

A fifty first embodiment can include the wellbore servicing composition of the fiftieth embodiment, wherein the thermally stable cross-linker indicates that greater than or equal to 90% of covalent bonds in the crosslinker remain intact after exposure to temperatures up to 350° F. in an aqueous environment for 16 hours.

A fifty second embodiment can include the wellbore servicing composition of the fiftieth or fifty first embodiment, wherein the thermally stable cross-linker is selected from pentaerythritol allyl ether (PAE), vinyl or allyl ethers of glycols, polyglycols or polyols, N, N'-divinylethyleneurea (DVEU), divinylbenzene, divinyltetrahydropyrimidin-2(1H)-one, triallyl amine, triallylalkylammonium halide, tetraallylammonium halide, divinyl ether, diallyl ether, N-vinyl-3(E)-ethylidene pyrrolidone, ethylidene bis (N-vinylpyrrolidone), or a combination thereof.

A fifty third embodiment can include the wellbore servicing composition of the fifty second embodiment, wherein the cross-linker further includes a (e.g., conventional, non-thermally stable) cross-linker selected from acrylate or methacrylate diesters of diols such as glycols, acrylate or methacrylate diesters, triesters, or higher functionality esters of polyols including sugar alcohols (e.g. ethylene glycol, diethylene glycol, triethylene glycol, polyethylene glycol, propylene glycol, polypropylene glycol, glycerol, pentaerythritol, 1,1,1-trimethylolpropane, erythritol, sorbitol, and the like) and sugars, and bisacrylamide compounds such as N,N'-methylene bisacrylamide, vinyl or allyl esters (such as diallyl carbonate, divinyl adipate, divinyl sebacate, diallyl phthalate, diallyl maleate, diallyl succinate), 1,3,5-triallyl-1,3-5-triazine-2,4,6(1H,3H,5H)-trione, and triallyl cyanurate, or a combination thereof.

A fifty fourth embodiment can include the wellbore servicing composition of any one of the fiftieth to fifty third embodiments further comprising a monomer that is not thermally stable.

A fifty fifth embodiment can include the wellbore servicing composition of any one of the thirty sixth to fifty fourth embodiments, comprising the inorganic particle, wherein the inorganic particle is selected from silica (e.g., crystalline silica, amorphous silica; treated fumed silica; partially treated fumed silica; colloidal silica; a silica-alumina composite particle, or a combination thereof), iron oxide, barite, alumina, clays, calcium carbonate, titanium oxide (e.g., titania or titanium dioxide), surface-modified versions thereof, or a combination thereof.

A fifty sixth embodiment can include the wellbore servicing composition of any one of the thirty sixth to fifty fifth embodiments, wherein the core comprises the organic particle, wherein the organic particle comprises a cellulosic particle (e.g., nut shells or other non-water soluble organic particles).

A fifty seventh embodiment can include the wellbore servicing composition of any one of the first to fifty sixth embodiments, wherein the core-shell particles (e.g., the core thereof) comprise primarily micro-particles (e.g., have an average particle size or a median particle size (d50) of from about 200 to about 1500 nm) or primarily nanoparticles (e.g., have an average particle size or a median particle size (d50) of less than or equal to about 200 nm).

A fifty eighth embodiment can include the wellbore servicing composition of any one of the first to fifty seventh embodiments, wherein the core-shell particles (e.g., the cores thereof) have an average particle size or a median particle size (d50) in a range of from about 1 to about 1500, from about 1 to about 1000, from about 1000 to about 1500 nm, or from about 50 to about 250 nm.

A fifty ninth embodiment can include the wellbore servicing composition of any one of the first to fifty eighth embodiments, wherein the polymer is associated with the core via covalent or non-covalent interactions.

A sixtieth embodiment can include the wellbore servicing composition of the fifty ninth embodiment, wherein the polymer is associated with the core via the covalent interactions, wherein the covalent interactions include (e.g., silane) additional chemistry, whereby the polymer is directly bonded to the surface of the particle of the core via (e.g., silane) chemical bonding.

A sixty first embodiment can include the wellbore servicing composition of the fifty ninth embodiment, wherein the polymer is associated with the core via the noncovalent interactions, wherein the non-covalent interactions include electrostatic interactions whereby the polymer is associated with the particle via electrostatic attraction.

A sixty second embodiment can include the wellbore servicing composition of the sixty first embodiment, wherein the polymer is not cross-linked.

A sixty third embodiment can include the wellbore servicing composition of any one of the thirty sixth to sixty second embodiments, wherein the wellbore servicing composition provides fluid loss control, well stability, cutting stability, pressure transmission reduction, or a combination thereof.

A sixty fourth embodiment can include the wellbore servicing composition of any one of the thirty sixth to sixty third embodiments, wherein the core-shell particles are hydrolysis resistant, such that the polymer does not break down, as indicated by a stable (i.e., changing by less than about 1, 2, 3, 4, or 5%) viscosity (e.g., over time).

A sixty fifth embodiment can include the wellbore servicing composition of any one of the thirty sixth to sixty fourth embodiments, wherein the treatment fluid has a total filtrate loss of less than 50, 30, or 15 milliliters using a particle plugging test with a disk having 12 micrometer pores at testing conditions of a pressure differential of 1,200 psi (8.3 megapascals) and a temperature of 180° F. (82.2° C.) for 30 minutes.

A sixty sixth embodiment can include the wellbore servicing composition of any one of the thirty sixth to sixty fifth embodiments, wherein the wellbore servicing composition has an API spurt loss of less than 5, 3, or 1 milliliters using a particle plugging test with a disk having 12 micrometer pores at testing conditions of a pressure differential of 1,200 psi (8.3 megapascals) and a temperature of 180° F. (82.2° C.) for 30 minutes.

In a sixty seventh embodiment, a method of treating a portion of a subterranean formation comprises: introducing a wellbore servicing composition into the subterranean formation, wherein the wellbore servicing composition comprises: a base fluid; and core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker; and causing or allowing the wellbore servicing fluid to stabilize and/or reduce fluid loss into permeable areas of the subterranean formation.

A sixty eighth embodiment can include the method of the sixty seventh embodiment, wherein the cores of the core-shell particles are coated with the polymeric shell prior and/or during to introduction of the wellbore servicing composition into the subterranean formation.

In a sixty ninth embodiment, a method of servicing a wellbore penetrating a subterranean formation comprises: preparing a wellbore servicing composition comprising: (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and optionally one or more cross-linkers, wherein the one or more monomers include a thermally stable monomer; and (b) a carrier fluid; and placing the wellbore servicing composition into the wellbore, the subterranean formation or both, wherein thermally stable indicates that inclusion of the thermally stable monomer in the wellbore servicing composition provides for stability of the core-shell particles (e.g., maintenance of association of the core with the shell of the core-shell particles, maintenance of cross-linking between the core and the shell) at temperatures of greater than or equal to at least about 300, 325, or 350° F. (148.9, 162.8, or 176.7° C.).

In a seventieth embodiment, a method of servicing a wellbore penetrating a subterranean formation comprises: preparing a wellbore servicing composition comprising: (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and one or more cross-linkers, wherein the one or more cross-linkers include a thermally stable cross-linker; and (b) a carrier fluid; and placing the wellbore servicing composition into the wellbore, the subterranean formation or both, wherein thermally stable indicates that inclusion of the thermally stable cross-linker in the wellbore servicing composition provides for stability of the core-shell particles (e.g., maintenance of (e.g., at least 80, 90, or 95%) association of the core with the shell of the core-shell particles, maintenance of (e.g., at least 80, 90, or 95%) cross-linking between the core and the shell) at temperatures of greater than or equal to at least about 300, 325, or 350° F. (148.9, 162.8, or 176.7° C.).

In a seventy first embodiment, a method of servicing a wellbore penetrating a subterranean formation comprises: preparing a wellbore servicing composition comprising: (a) core-shell particles comprising a core and a shell, wherein the shell wholly or partially surrounds the core, and wherein: (i) the core of each of the core-shell particles comprises a particle selected from an inorganic particle or an organic particle; and (ii) the shell comprises a polymer that is a polymerization product of one or more monomers and one or more cross-linkers, wherein the one or more monomers include a thermally stable monomer and the one or more cross-linkers include a thermally stable cross-linker; and (b) a carrier fluid; and placing the wellbore servicing composition into the wellbore, the subterranean formation or both, wherein thermally stable indicates that inclusion of the thermally stable monomer and the thermally stable cross-linker in the wellbore servicing composition provides for stability of the core-shell particles (e.g., maintenance of association of the core with the shell of the core-shell particles, maintenance of cross-linking between the core and the shell) at temperatures of greater than or equal to at least about 300, 325, or 350° F. (148.9, 162.8, or 176.7° C.).

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wellbore servicing composition comprising:

(a) core-shell particles comprising a core and a shell, wherein the shell wholly or partially surrounds the core, wherein the core-shell particles do not substantially swell in water, and wherein:

(i) the core of each of the core-shell particles comprises silica, alumina, titania, barite, ilmenite, iron oxide, calcium carbonate, barium sulfate, manganese tetroxide, clays, cellulosics, carbon black, bitumen, fly ash, or combinations thereof; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker, wherein the thermally stable cross-linker is selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, diallyl ether, N-vinyl-3(E)-ethylidene pyrrolidone, ethylidene bis(N-vinylpyrrolidone), or a combination thereof, and wherein the thermally stable monomer is selected from N-vinylpyrrolidone (NVP), vinylbenzenesulfonate, diallyldimethyl ammonium halide, 1-vinylimidazole, 4-vinylpyridine, or a combination thereof, (I) wherein the one or more monomers include a thermally stable monomer selected from vinylbenzenesulfonate, 1-vinylimidazole, 4-vinylpyridine, or a combination thereof, and the one or more thermally stable cross-linkers, when also present, include a thermally stable cross-linker selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, diallyl ether, N-vinyl-3(E)-ethylidene pyrrolidone, ethylidene bis(N-vinylpyrrolidone), or a combination thereof; or (II) wherein the one or more cross-linkers include a thermally stable cross-linker selected from pentaerythritol allyl ether (PAE), vinyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, diallyl ether, N-vinyl-3(E)-ethylidene pyrrolidone, ethylidene bis(N-vinylpyrrolidone), or a combination thereof, and the one or more thermally stable monomers, when also present, include a thermally stable monomer selected from N-vinylpyrrolidone (NVP), vinylbenzenesulfonate, diallyldimethyl ammonium halide, 1-vinylimidazole, 4-vinylpyridine, or a combination thereof; and (b) a carrier fluid.

2. The wellbore servicing composition of claim 1, wherein the one or more cross-linkers include the thermally stable cross-linker.

3. The wellbore servicing composition of claim 2, comprising (II), wherein the thermally stable cross-linker is selected from pentaerythritol allyl ether (PAE), N,N'-divinylethyleneurea (DVEU), divinylbenzene, divinyltetrahydropyrimidin-2(1H)-one, dienes, triallyl amine, and tetraallylammonium derivatives, divinyl ether, N-vinyl-3(E)-ethylidene pyrrolidone, ethylidene bis(N-vinylpyrrolidone), or a combination thereof.

4. The wellbore servicing composition of claim 1, wherein the one or more monomers include the thermally stable monomer.

5. The wellbore servicing composition of claim 1, comprising (II), wherein the one or more monomers include the thermally stable monomer, and wherein the thermally stable monomer is selected from vinylbenzenesulfonate, 1-vinylimidazole, 4-vinylpyridine, or a combination thereof.

6. The wellbore servicing composition of claim 1, wherein the one or more cross-linkers include the thermally stable cross-linker.

7. The wellbore servicing composition of claim 1, wherein the thermally stable cross-linker is selected from pentaerythritol allyl ether (PAE), N,N'-divinylethyleneurea (DVEU), divinylbenzene, divinyltetrahydropyrimidin-2(1H)-one, dienes, triallyl amine, and tetraallylammonium derivatives, N-vinyl-3(E)-ethylidene pyrrolidone, ethylidene bis(N-vinylpyrrolidone), or a combination thereof.

8. A method of servicing a wellbore penetrating a subterranean formation, the method comprising:

preparing a wellbore servicing composition comprising:

(a) core-shell particles comprising a core and a shell, wherein the shell wholly or partially surrounds the core, wherein the core-shell particles do not substantially swell in water, and wherein:

(i) the core of each of the core-shell particles comprises a particle selected from silica, alumina, titania, barite, ilmenite, iron oxide, calcium carbonate, barium sulfate, manganese tetroxide, clays, cellulosics, carbon black, bitumen, fly ash, or combinations thereof; and (ii) the shell comprises a polymer that is a polymerization product of one or more monomers and optionally one or more cross-linkers, wherein the one or more monomers include a thermally stable monomer, the one or more cross-linkers include a thermally stable crosslinker, or wherein the one or more monomers include the thermally stable monomer and the one or more cross-linkers include the thermally stable cross-linker, wherein the thermally stable cross-linker is selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, diallyl ether, N-vinyl-3(E)-ethylidene pyrrolidone, ethylidene bis(N-vinylpyrrolidone), or a combination thereof, and wherein the thermally stable monomer is selected from N-vinylpyrrolidone (NVP), vinylbenzenesulfonate, diallyldimethyl ammonium halide, 1-vinylimidazole, 4-vinylpyridine, or a combination thereof, (I) wherein the one or more monomers include a thermally stable monomer selected from vinylbenzenesulfonate, 1-vinylimidazole, 4-vinylpyridine, or a combination thereof, and the one or more thermally stable cross-linkers, when also present, include a thermally stable cross-linker selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, diallyl ether, N-vinyl-3(E)-ethylidene pyrrolidone, ethylidene bis(N-vinylpyrrolidone), or a combination thereof; or (II) wherein the one or more cross-linkers include a thermally stable cross-linker selected from pentaerythritol allyl ether (PAE), vinyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, N-vinyl-3(E)-ethylidene pyrrolidone, ethylidene bis(N-vinylpyrrolidone), or a combination thereof, and the one or more thermally stable monomers, when also present, include a thermally stable monomer selected from N-vinylpyrrolidone (NVP), vinylbenzenesulfonate, diallyldimethyl ammonium halide, 1-vinylimidazole, 4-vinylpyridine, or a combination thereof; and (b) a carrier fluid; and placing the wellbore servicing composition into the wellbore, the subterranean formation or both, wherein thermally stable indicates that inclusion of the thermally stable monomer, the thermally stable cross-linker, or both the thermally stable monomer and the thermally stable cross-linker in the wellbore servicing composition provides for stability of the core-shell particles as indicated by maintenance of association of the core with the shell of the core-shell particles at temperatures of greater than or equal to at least about 300° F. (148.9° C.).

9. The method of claim 8, wherein the one or more cross-linkers include the thermally stable cross-linker.

10. The method of claim 9, comprising (II), wherein the thermally stable cross-linker is selected from pentaerythritol allyl ether (PAE), N,N'-divinylethyleneurea (DVEU), divinylbenzene, divinyltetrahydropyrimidin-2(1H)-one, dienes, triallyl amine and tetraallylammonium derivatives divinyl ether, N-vinyl-3(E)-ethylidene pyrrolidone, ethylidene bis (N-vinylpyrrolidone), or a combination thereof.

11. The method of claim 8, wherein the cross-linker includes a non-thermally stable cross-linker selected from acrylate or methacrylate diesters of diols, triesters, or higher functionality esters of polyols including sugar alcohols and sugars, bisacrylamide compounds, vinyl or allyl esters, 1,3,5-triallyl-1,3-5-triazine-2,4,6(1H,3H,5H)-trione, triallyl cyanurate, or a combination thereof.

12. The method of claim 8, wherein the one or more monomers include the thermally stable monomer.

13. The method of claim 12, the polymer further comprising a monomer that is not thermally stable, wherein the monomer that is not thermally stable is selected from acrylamide, methacrylamide, N,N-dimethylacrylamide, N-isopropylacrylamide, acrylic acid and salts thereof, 2-acryloylamino-2-methylpropane-1-sulfonic acid (AMPSA) and salts thereof, dimethylaminopropyl methacrylamide (DMAPMA), methacrylamido propyltrimethylammonium chloride (MAPTAC), [3-(acryloylamino)propyl] trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC), or a combination thereof.

14. The method of claim 12, wherein the one or more cross-linkers include the thermally stable cross-linker.

15. The method of claim 8, comprising (II), wherein the one or more monomers include the thermally stable monomer, and wherein the thermally stable monomer is selected from vinylbenzenesulfonate, diallyldimethyl ammonium halide, 1-vinylimidazole, 4-vinylpyridine, or a combination thereof.

16. The method of claim 8, wherein the thermally stable cross-linker is selected from pentaerythritol allyl ether (PAE), N,N'-divinylethyleneurea (DVEU), divinylbenzene, divinyltetrahydropyrimidin-2(1H)-one, dienes, triallyl amine and tetraallylammonium derivatives, N-vinyl-3(E)-ethylidene pyrrolidone, ethylidene bis(N-vinylpyrrolidone), or a combination thereof.

17. The method of claim 8, wherein the one or more cross-linkers include a non-thermally stable cross-linker selected from acrylate or methacrylate diesters of diols, acrylate or methacrylate diesters, triesters, or higher functionality esters of polyols and sugars, bisacrylamide compounds, vinyl or allyl esters, 1,3,5-triallyl-1,3-5-triazine-2,4,6(1H,3H,5H)-trione, triallyl cyanurate, or a combination thereof.

18. The method of claim 8, the polymer comprising a monomer that is not thermally stable, wherein the monomer that is not thermally stable is selected from acrylamide, methacrylamide, N,N-dimethylacrylamide, N-isopropylacrylamide, acrylic acid and salts thereof, 2-acryloylamino-2-methylpropane-1-sulfonic acid (AMPSA) and salts thereof, dimethylaminopropyl methacrylamide (DMAPMA), methacrylamido propyltrimethylammonium chloride (MAPTAC), [3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC), or a combination thereof.

19. A method of treating a portion of a subterranean formation comprising:

introducing a wellbore servicing composition into the subterranean formation, wherein the wellbore servicing composition comprises: a base fluid; and core-shell particles comprising a core and a shell, wherein the shell wholly or partially surrounds the core, wherein the core-shell particles do not substantially swell in water, and wherein: (i) the core of each of the core-shell particles comprises silica, alumina, titania, barite, ilmenite, iron oxide, calcium carbonate, barium sulfate, manganese tetroxide, clays, cellulosics, carbon black, bitumen, fly ash, or combinations thereof; and (ii) the shell comprises a polymer that is a polymerization product of one or more monomers and optionally one or more cross-linkers, wherein the one or more monomers include a thermally stable monomer, the one or more cross-linkers include a thermally stable cross-linker, or wherein the one or more monomers include the thermally stable monomer and the one or more cross-linkers include the thermally stable cross-linker, wherein the thermally stable cross-linker is selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, diallyl ether, N-vinyl-3(E)-ethylidene pyrrolidone, ethylidene bis(N-vinylpyrrolidone), or a combination thereof, and wherein the thermally stable monomer is selected from N-vinylpyrrolidone (NVP), vinylbenzenesulfonate, diallyldimethyl ammonium halide, 1-vinylimidazole, 4-vinylpyridine, or a combination thereof, (I) wherein the one or more monomers include a thermally stable monomer selected from vinylbenzenesulfonate, 1-vinylimidazole, 4-vinylpyridine, or a combination thereof, and the one or more thermally stable cross-linkers, when also present, include a thermally stable cross-linker selected from pentaerythritol allyl ether (PAE), vinyl or allyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives divinyl ether, diallyl ether, N-vinyl-3(E)-ethylidene pyrrolidone, ethylidene bis(N-vinylpyrrolidone), or a combination thereof, or (II) wherein the one or more cross-linkers include a thermally stable cross-linker selected from pentaerythritol allyl ether (PAE), vinyl ethers of glycols, polyglycols or polyols, N,N'-divinylethyleneurea (DVEU), divinylbenzene, divinyltetrahydropyrimidin-2(1H)-one, dienes, triallyl amine and tetraallylammonium derivatives, divinyl ether, diallyl ether, N-vinyl-3(E)-ethylidene pyrrolidone, ethylidene bis(N-vinylpyrrolidone), or a combination thereof, and the one or more thermally stable monomers, when also present, include a thermally stable monomer selected from N-vinylpyrrolidone (NVP), vinylbenzenesulfonate, diallyldimethyl ammonium halide, 1-vinylimidazole, 4-vinylpyridine, or a combination thereof; and causing or allowing the wellbore servicing fluid to stabilize and/or reduce fluid loss into permeable areas of the subterranean formation.

20. The method of claim 8, wherein greater than or equal to 90% of covalent bonds in the thermally stable cross-linker and the thermally stable monomer remain intact after exposure to temperatures up to 350° F. in an aqueous environment for 16 hours.

* * * * *